(12) United States Patent
Richie

(10) Patent No.: US 10,435,981 B2
(45) Date of Patent: Oct. 8, 2019

(54) SEAL ARRANGEMENT FOR ROTATING EQUIPMENT

(71) Applicant: KALSI ENGINEERING INC., Sugar Land, TX (US)

(72) Inventor: Aaron Paul Richie, Missouri City, TX (US)

(73) Assignee: KALSI ENGINEERING INC., Sugar Land, TX (US)

( * ) Notice: Subject to any disclaimer, the term of this patent is extended or adjusted under 35 U.S.C. 154(b) by 0 days.

(21) Appl. No.: 16/162,008

(22) Filed: Oct. 16, 2018

(65) Prior Publication Data

US 2019/0112890 A1  Apr. 18, 2019

Related U.S. Application Data

(60) Provisional application No. 62/707,023, filed on Oct. 17, 2017.

(51) Int. Cl.
| | |
|---|---|
| *E21B 33/08* | (2006.01) |
| *F16J 15/16* | (2006.01) |
| *F16J 15/48* | (2006.01) |
| *F16J 15/00* | (2006.01) |
| *F16J 15/324* | (2016.01) |
| *E21B 4/00* | (2006.01) |

(Continued)

(52) U.S. Cl.
CPC ............ *E21B 33/085* (2013.01); *E21B 4/003* (2013.01); *F16J 15/002* (2013.01); *F16J 15/006* (2013.01); *F16J 15/166* (2013.01); *F16J 15/324* (2013.01); *F16J 15/40* (2013.01); *F16J 15/48* (2013.01); *E21B 10/25* (2013.01)

(58) Field of Classification Search
CPC ...... F16J 15/002; F16J 15/164; F16J 15/3236; F16J 15/324; F16J 15/3244; F16J 15/40; E21B 4/003; E21B 33/085; E21B 10/25
See application file for complete search history.

(56) References Cited

U.S. PATENT DOCUMENTS

| | | | | |
|---|---|---|---|---|
| 3,857,655 | A | * | 12/1974 | Tschirky ................. E21B 4/003 |
| | | | | 418/48 |
| 3,887,197 | A | * | 6/1975 | Kapich ................. F16J 15/004 |
| | | | | 277/347 |
| 3,901,517 | A | | 8/1975 | Heathcott |

(Continued)

OTHER PUBLICATIONS

International Search Report dated dated Jan. 29, 2019 for PCT/US2018/056114 filed Oct. 16, 2018.

*Primary Examiner* — Nicholas L Foster
(74) *Attorney, Agent, or Firm* — Bracewell LLP; Douglas W. Rommelmann

(57) ABSTRACT

A sealing arrangement having inboard and outboard dynamic seals in a housing separated by a barrier fluid and having a sealed relationship with a relatively movable bearing-guided shaft. A bearing chamber having bearing lubricant exposed to the inboard dynamic seal. The inboard dynamic seal is a hydrodynamic seal having a hydrodynamic pumping action in response to relative rotation between the shaft and the inboard dynamic seal. The hydrodynamic pumping action forcing a film of the bearing lubricant between the inboard dynamic seal and the shaft. The hydrodynamic pumping-related leakage of the inboard dynamic seal being returned to the bearing chamber in which the shaft guidance bearings are located.

24 Claims, 6 Drawing Sheets

(51) Int. Cl.
*F16J 15/40* (2006.01)
*E21B 10/25* (2006.01)

(56) References Cited

U.S. PATENT DOCUMENTS

| | | | | |
|---|---|---|---|---|
| 3,912,425 | A * | 10/1975 | Tschirky | E21B 4/003 |
| | | | | 418/48 |
| 4,067,407 | A | 7/1978 | Berg | |
| 4,098,561 | A * | 7/1978 | Tschirky | E21B 4/003 |
| | | | | 277/504 |
| 4,193,606 | A | 3/1980 | Iverson | |
| 4,328,972 | A | 5/1982 | Alobertson et al. | |
| 4,484,753 | A | 11/1984 | Kalsi | |
| 4,500,093 | A * | 2/1985 | Kapich | F16J 15/40 |
| | | | | 277/347 |
| 5,224,557 | A | 7/1993 | Yenulis et al. | |
| 5,230,520 | A | 7/1993 | Dietle et al. | |
| 5,279,365 | A | 1/1994 | Yenulis et al. | |
| 5,607,165 | A * | 3/1997 | Bredemeyer | F16J 15/406 |
| | | | | 277/320 |
| 5,738,358 | A | 4/1998 | Kalsi et al. | |
| 6,036,192 | A | 3/2000 | Dietle et al. | |
| 6,120,036 | A | 9/2000 | Kalsi et al. | |
| 6,227,547 | B1 | 5/2001 | Dietle et al. | |
| 6,315,302 | B1 | 11/2001 | Conroy et al. | |
| 6,382,634 | B1 | 5/2002 | Dietle et al. | |
| 6,494,462 | B2 | 12/2002 | Dietle | |
| 6,554,016 | B2 | 4/2003 | Kinder | |
| 6,736,404 | B1 | 5/2004 | Shuster | |
| 6,749,172 | B2 | 6/2004 | Kinder | |
| 6,883,804 | B2 | 4/2005 | Cobb | |
| 7,004,444 | B2 | 2/2006 | Kinder | |
| 7,007,913 | B2 | 3/2006 | Kinder | |
| 7,052,020 | B2 | 5/2006 | Gobeli et al. | |
| 7,562,878 | B2 | 7/2009 | Dietle et al. | |
| 7,770,898 | B2 | 8/2010 | Dietle et al. | |
| 8,056,904 | B2 | 11/2011 | Dietle et al. | |
| 8,075,000 | B2 | 12/2011 | James et al. | |
| 8,550,467 | B2 | 10/2013 | Dietle et al. | |
| 9,086,151 | B2 | 7/2015 | Dietle et al. | |
| 9,103,445 | B2 | 8/2015 | Schroeder et al. | |
| 9,121,503 | B2 | 9/2015 | Dietle et al. | |
| 9,316,319 | B2 | 4/2016 | Dietle | |
| 10,054,226 | B1 * | 8/2018 | Watson | F16J 15/002 |
| 2003/0193035 | A1 | 10/2003 | Kinder | |
| 2004/0084220 | A1 | 5/2004 | Bailey et al. | |
| 2011/0127725 | A1 | 6/2011 | Dietle | |
| 2014/0035238 | A1 * | 2/2014 | Richie | F16J 15/441 |
| | | | | 277/559 |
| 2017/0114606 | A1 * | 4/2017 | Bailey | E21B 33/085 |

* cited by examiner

SEAL ARRANGEMENT FOR ROTATING EQUIPMENT

CROSS-REFERENCE TO RELATED APPLICATIONS

This application claims the benefit of U.S. Provisional Application Ser. No. 62/707,023 filed Oct. 17, 2017, entitled "Sealing Arrangement for RCDs and Other Rotating Equipment." Applicant incorporates by reference herein Application Ser. No. 62/707,023 in its entirety.

BACKGROUND OF THE INVENTION

1. Field of the Invention

The present invention relates generally to rotary equipment that seals differential pressure. While applicable to many types of rotary equipment, the invention is particularly well suited for underbalanced oilfield drilling equipment of the type that is used for pressure control of wells while drilling. Such drilling equipment is called by various names such as rotary blowout preventer, rotary head, rotary diverter, and rotating control device (RCD).

2. Description of the Related Art

Testing has shown that some types of rotary seals exclude abrasives well in low differential pressure conditions, and has also shown that some types of rotary seals retain high differential pressure well in clean operating conditions.

In some types of rotary equipment, such as an RCD, the rotary seals are required to retain an abrasive fluid. In certain operating conditions, this abrasive fluid has high pressure, which exposes at least one rotary seal to high differential pressure. In other operating conditions, the abrasive fluid may only have low differential pressure, which may increase the hydrodynamic pumping-related leak rate of any hydrodynamic seals that are being used.

One way to deal with this situation is to pressurize the bearing oil to a value that approximates the pressure of the high-pressure abrasive fluid. With such an arrangement, the rotary seal above the bearings is exposed to high differential pressure by the clean bearing lubricant, and the lower rotary seal is exposed to low differential pressure and the abrasive fluid. Such systems require a relatively complex, and typically expensive, lubricant pressurization system that is responsive to the pressure of the abrasive fluid. Examples of such RCD designs are disclosed in commonly assigned U.S. Pat. Nos. 6,227,547 and 9,316,319, and in third-party U.S. Pat. Nos. 5,224,557, 5,279,365, 6,554,016, 6,749,172, 7,004,444, and 7,007,913.

An RCD that reliably resists high differential pressure without the need for an expensive system to pressurize the bearing lubricant is highly desirable from an economic standpoint.

BRIEF SUMMARY OF THE INVENTION

The present invention is a dynamic sealing arrangement that includes a shaft and a housing. Preferably, at least a portion of the housing is located radially outward from and encircles at least a portion of the shaft, with the shaft being movable relative to the housing.

Preferably, a bearing chamber is located radially between at least a portion of the housing and at least a portion of the shaft, and a bearing is located at least partially within the bearing chamber and provides radial guidance between the housing and the shaft.

Preferably, an inboard dynamic seal and an outboard dynamic seal contact and establish sealing with the housing and the shaft, and a barrier fluid chamber is located axially between the inboard and outboard dynamic seals and located radially between the shaft and the housing and encircling a portion of the shaft.

Preferably, a bearing lubricant is at least partially within the bearing chamber and has a bearing lubricant pressure, and a barrier fluid is at least partially within the barrier fluid chamber and has a barrier fluid pressure. Preferably, a process fluid is located outboard of the outboard dynamic seal and has a process fluid pressure. For the purposes of this specification, the term "fluid" has its broadest meaning, encompassing both liquids and gases.

Preferably, the inboard dynamic seal is exposed to the bearing lubricant and the barrier fluid, separates the bearing lubricant from the barrier fluid, and separates the bearing lubricant pressure from the barrier fluid pressure. Preferably, the outboard dynamic seal is exposed to the barrier fluid and the process fluid, separates the barrier fluid from the process fluid, and separates the barrier fluid pressure from the process fluid pressure.

Preferably, an outlet port is in fluid communication with the bearing chamber and is exposed to the bearing lubricant and the bearing lubricant pressure, the outlet port having first and second ends. Preferably, a stationary seat of annular form is located radially outward from one of the first and second ends of the outlet port and is stationary relative to the housing.

Preferably, a movable assembly comprising a valve control piston and a movable seat is provided, the movable assembly being axially movable relative to the housing and relative to the stationary seat and relative to the outlet port.

Preferably, the valve control piston has a first piston end facing in a generally axial direction away from the stationary seat and has a second piston end facing in a generally axial direction toward the stationary seat.

Preferably, the movable seat has a seating surface facing in a generally axial direction toward and adjoining the stationary seat and facing in a generally axial direction toward the outlet port. Preferably, the barrier fluid is in fluid communication with the barrier fluid chamber and with at least part of the seating surface of the movable seat.

Preferably, a compression spring is compressed axially and produces a generally axially oriented force acting on the movable assembly in a generally axial direction toward the stationary seat. Preferably, the process fluid pressure produces a first axial hydraulic force acting on the movable assembly in a generally axial direction toward the stationary seat and the barrier fluid pressure produces a second axial hydraulic force acting on the movable assembly in a generally axial direction away from the stationary seat.

Preferably, the inboard dynamic seal is a hydrodynamic seal having a hydrodynamic pumping action in response to relative rotation between the shaft and the inboard dynamic seal, the hydrodynamic pumping action forcing a film of the bearing lubricant between the inboard dynamic seal and the shaft and into the barrier fluid. Preferably, the hydrodynamic pumping action causes the barrier fluid pressure to become slightly greater than the process fluid pressure, and the barrier fluid pressure acting on the movable assembly causes at least part of the seating surface of the movable seat to temporarily move in a generally axial direction away from the stationary seat, allowing barrier fluid to temporarily pass between the seating surface and the stationary seat and into the outlet port.

Preferably, at least a portion of a first body component is located radially outward of and encircles at least a portion of the movable assembly and has a sealed relationship with the valve control piston of the movable assembly. Preferably, a control piston seal contacts and is radially compressed between the first body component and the valve control piston, producing the sealed relationship between the first body component and the valve control piston, or else a piston diaphragm provides the sealed relationship between the first body component and the valve control piston. Preferably, the sealed relationship creates a first pressure area acted on by the process fluid pressure producing the first axial hydraulic force and creates a second pressure area acted on by the barrier fluid pressure producing the second axial hydraulic force.

Preferably, a movable partition having a predetermined range of movement is located between the barrier fluid and the process fluid, the movable partition causing the barrier fluid pressure to approximate the process fluid pressure when operating within the predetermined range of movement. Preferably, the movable partition is a pressure compensation piston or a pressure compensation diaphragm.

Preferably, a second body component of annular form is threadedly retained to the first body component and defines the stationary seat. Preferably, at least one of the first and second body components defines a guide bore facing radially inward toward and encircling at least a portion of the movable assembly and providing lateral guidance to a portion of the movable assembly. Preferably, the first body component provides at least some lateral guidance to a portion of the movable assembly.

Preferably, the first body component has an inlet port communicating the barrier fluid to a portion of the movable assembly. Preferably, the inlet port is generally radially oriented, and the movable assembly includes a valve stem having an engagement hole that is generally radially oriented and alignable with the inlet port.

Preferably, the housing defines a valve recess and the first and second body components are located at least partially within the valve recess. Preferably, a first body seal contacts and provides sealing between the first body component and the housing. Preferably, a second body seal contacts and is compressed between and provides sealing between the second body component and the housing.

BRIEF DESCRIPTION OF THE SEVERAL VIEWS OF THE DRAWINGS

So that the manner in which the above recited features, advantages, and aspects of the present invention are attained and can be understood in detail, a more particular description of the invention, briefly summarized above, may be had by reference to the embodiments thereof that are illustrated in the appended drawings. It is to be noted, however, that the appended drawings only illustrate preferred embodiments of this invention, and are therefore not to be considered limiting of its scope, for the invention may admit to other equally effective embodiments that vary only in specific detail.

In the drawings.

DESCRIPTION OF THE PREFERRED EMBODIMENTS

Figure 1A:
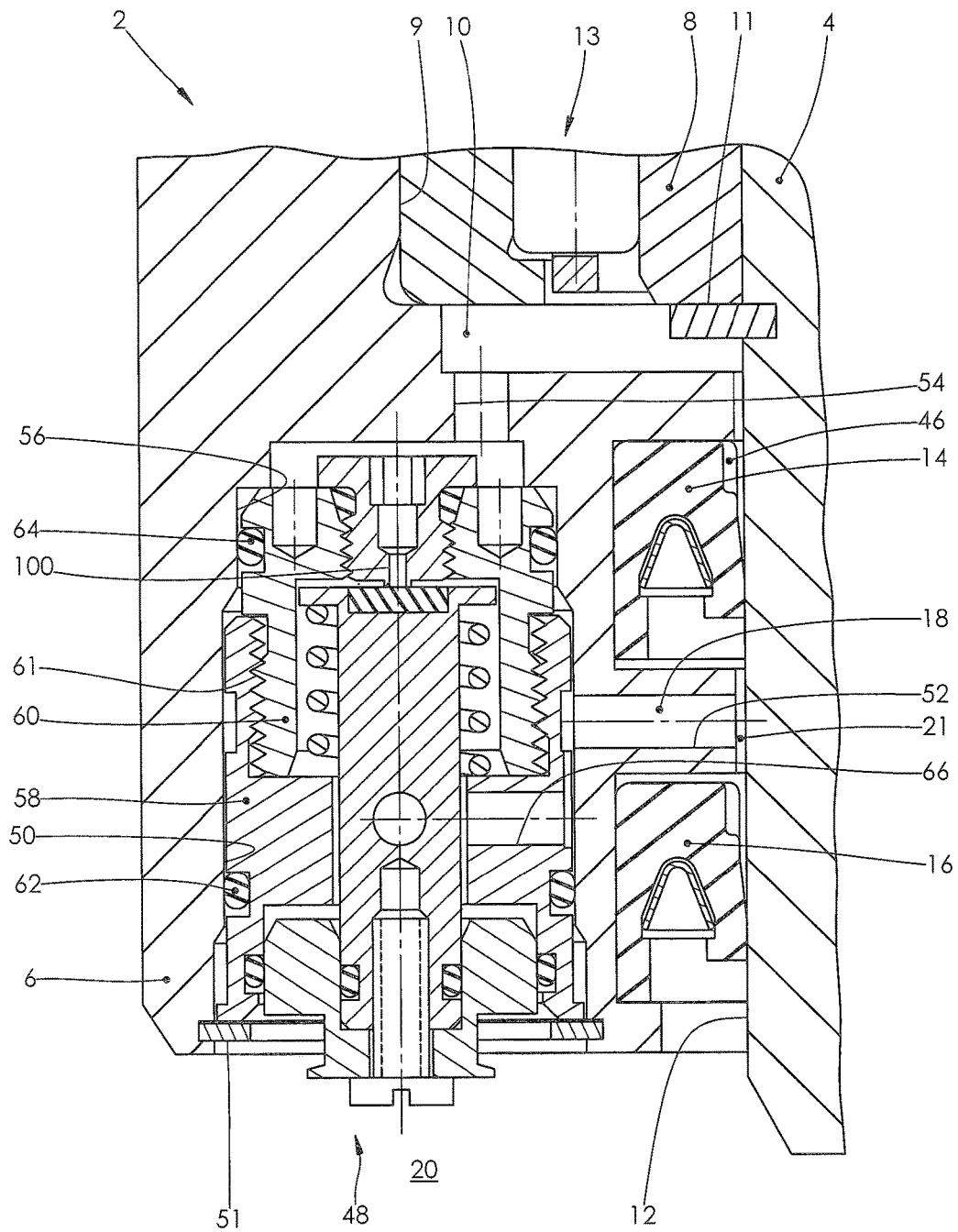
FIG. 1A is a fragmentary cross-sectional view of a preferred embodiment of a sealing arrangement at a first angular location showing inboard and outboard seals and a valve assembly.

The sealing arrangement according to the preferred embodiments of the present invention is generally referred to as reference number 2 in the drawings. Features throughout this specification that are represented by like numbers have the same basic function.

FIGS. 1A-1C

Figure 1B:
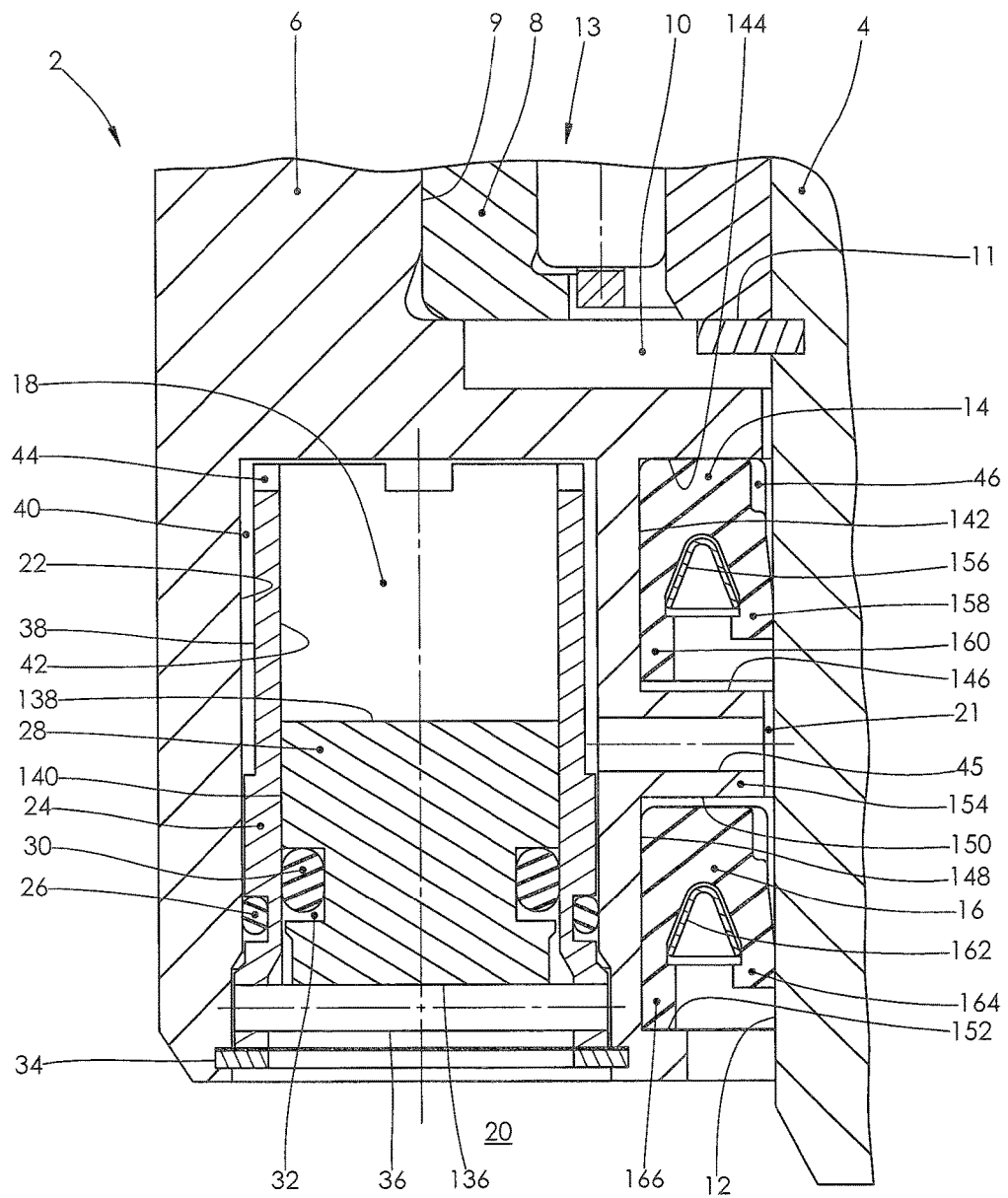
FIG. 1B is a fragmentary cross-sectional view of the sealing arrangement of FIG. 1A at a second angular location showing the inboard and outboard seals and a pressure compensation assembly.
Figure 1C:
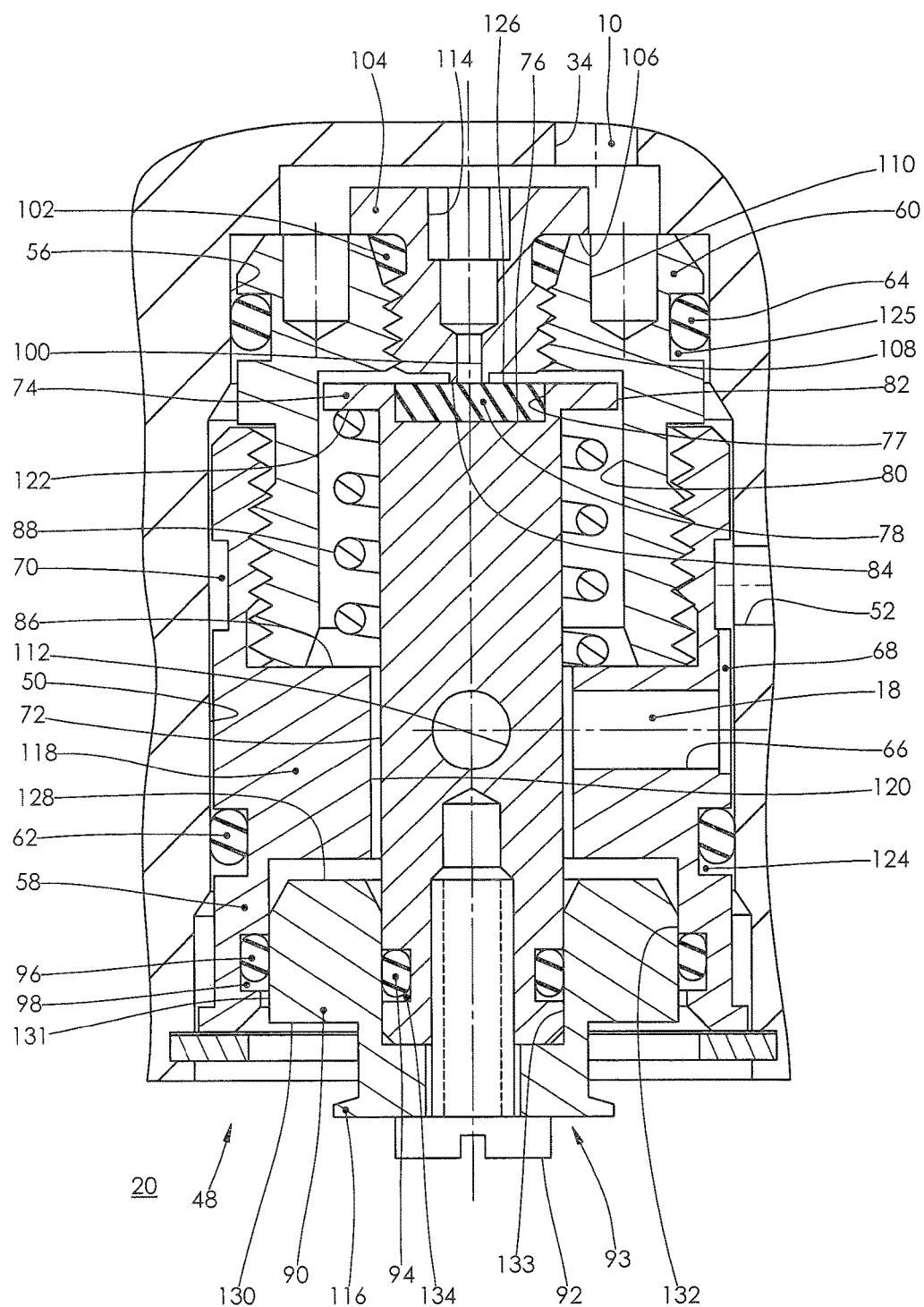
FIG. 1C is an enlarged view of the valve assembly shown in the fragmentary cross-sectional view of the sealing arrangement of FIG. 1A.

FIGS. 1A and 1B are fragmentary cross-sectional views representing two different angular locations of a preferred embodiment of the present invention, and FIG. 1C is an enlargement of a portion of FIG. 1A. FIGS. 1A-1C should be studied together, to attain a more complete understanding of the invention.

Referring now to FIG. 1A, a sealing arrangement is shown generally at 2. A shaft 4 is located at least partially within a housing 6 and is movable relative to the housing 6 in at least one circumferential or axial direction, relative circumferential movement being relative rotation. In an RCD, and in some other types of rotary equipment, the shaft 4 is sometimes called a mandrel, and rotates relative to the housing 6. In some RCDs, the shaft 4 also reciprocates relative to the housing 6. The shaft 4 and housing 6 are preferably located radially and axially relative to one another by one or more bearings. A representative bearing is identified by reference number 8. Although the bearing 8 is illustrated as a roller bearing, the selection of this type of bearing for inclusion in FIG. 1 is not intended to limit the spirit or scope of the invention. For example, it may be useful to locate the shaft 4 both radially and axially by angular contact bearings. For another example, it may be useful to locate the shaft 4 radially and axially by angular contact bearings, and then at the time of final assembly, locate the housing 6 relative to the shaft 4 by a roller bearing. Preferably, the bearing 8 is exposed to and lubricated by a bearing lubricant 10 having a bearing lubricant pressure. Preferably, the bearing lubricant pressure of the bearing lubricant 10 is maintained at atmospheric pressure, and in some cases, it may be preferable to accomplish this by venting the bearing lubricant 10 to atmospheric pressure. The venting of bearing lubricant to atmospheric pressure is well known in the art, and is used, for example, in automobile differentials. If desired, the bearing 8 can be mounted within a bearing mounting bore 9 of the housing 6. Preferably, the bearing mounting bore 9 is a radially inward-facing cylindrical surface that encircles at least part of the bearing 8 and at least part of the shaft 4. If desired, the shaft 4 can incorporate a bearing shoulder 11 for locating, or being located by, the bearing 8. If desired, the bearing shoulder 11 can be separable from the shaft 4, as shown. Alternately, the bearing shoulder 11 can be integral with the shaft 4.

The general region where the bearing or bearings are located in a piece of rotating equipment, such as an RCD, is sometimes called a bearing chamber. In FIG. 1A, the bearing chamber is identified by reference number 13. The bearing chamber 13 is typically located radially between a portion of the housing 6 and a portion of the shaft 4. Preferably, at least some of the bearing lubricant 10 is located within the bearing chamber 13 where it provides lubrication to the bearing 8 and preferably lubrication for an inboard dynamic seal 14. The bearing shoulder 11 is preferably located within the bearing chamber 13. Preferably, the bearing 8 is located at least partially within the bearing chamber 13. Preferably, the mounting bore 9 forms one of the surfaces of the bearing chamber 13. Preferably, the bearing 8 provides radial guidance between the housing 6 and the shaft 4. In many cases the bearing 8 locates the shaft 4 for rotation within the housing 6, but arrangements are possible where the bearing 8 locates the housing 6 for rotation around the shaft 4.

The housing 6 can be a single piece, as shown, or can be made from an assembly of housing components. Preferably, the housing 6 is annular in form and located radially outward from and encircles (surrounds) at least a portion of the shaft 4. If desired, the shaft 4 may be hollow. For example, when the sealing arrangement 2 is used in an RCD, the shaft 4 is hollow, to accept a drill string that passes axially through the shaft 4.

Preferably, the shaft 4 has a sealing surface 12 that is generally cylindrical in form and faces radially outward. Preferably, the sealing surface 12 is encircled by at least a portion of the housing 6, and at least a portion of the housing 6 is located radially outward from and encircles at least a portion of the shaft 4.

Preferably, the sealing surface 12 is engaged by the inboard dynamic seal 14 and an outboard dynamic seal 16 that have a sliding relationship with the sealing surface 12 when relative movement between the shaft 4 and the housing 6 occurs. Preferably, the inboard dynamic seal 14 and the outboard dynamic seal 16 have sealing contact with the sealing surface 12 of the shaft 4. In an RCD, the relative movement between the shaft 4 and the housing 6 typically takes the form of rotation relative to the housing 6, and rotation relative to the inboard and outboard dynamic seals 14, 16. RCD variations are possible where the shaft 4 has both rotation and axial movement relative to the housing 6 and the inboard and outboard dynamic seals 14, 16.

Within this specification, the terms "inboard" and "outboard" are used in some of the nomenclature. For example, inboard and outboard dynamic seals 14, 16 respectively, are identified. When the terms "inboard" and "outboard" are included in the nomenclature used to name pairs of items or features, or used to describe relative positions of items or features, the inboard item or feature is located closer to the bearing chamber 13 and the bearing 8, and the outboard item or feature is located farther from the bearing chamber 13 and the bearing 8.

Preferably, a barrier fluid 18 having a barrier fluid pressure is located between the inboard dynamic seal 14 and the outboard dynamic seal 16. Preferably, a process fluid 20 having a process fluid pressure is located outboard of the outboard dynamic seal 16. Preferably, the inboard dynamic seal 14 is exposed to the bearing lubricant 10 and the barrier fluid 18 and separates the bearing lubricant 10 from the barrier fluid 18 and separates the bearing lubricant pressure from the barrier fluid pressure. Preferably, the outboard dynamic seal 16 is exposed to the barrier fluid 18 and the process fluid 20 and separates the barrier fluid 18 from the process fluid 20 and separates the barrier fluid pressure from the process fluid pressure. The barrier fluid 18 is preferably a lubricant and is preferably the same type and viscosity of lubricant as the bearing lubricant 10. In an RCD and several other types of oilfield rotary equipment, the process fluid 20 is ordinarily highly abrasive drilling fluid, which is sometimes referred to as mud.

Preferably, a barrier fluid chamber 21 is located axially between the inboard dynamic seal 14 and the outboard dynamic seal 16 and radially between at least a portion of the housing 6 and the sealing surface 12 of the shaft 4. Preferably, the barrier fluid chamber 21 is located outboard of the inboard dynamic seal 14 and inboard of the outboard dynamic seal 16.

Preferably, the barrier fluid chamber 21 is defined in part by the inboard dynamic seal 14 and the outboard dynamic seal 16, and is defined in part by the housing 6 and the sealing surface 12 of the shaft 4. Preferably, some of the barrier fluid 18 is located at least partially within the barrier fluid chamber 21.

Temporarily referring now to FIG. 1B, the sealing arrangement is shown generally at 2, and the shaft 4, housing 6, bearing 8, bearing mounting bore 9, bearing lubricant 10, bearing shoulder 11, sealing surface 12, bearing chamber 13, inboard dynamic seal 14, outboard dynamic seal 16, barrier fluid 18, and process fluid 20 are identified with reference numbers. Preferably, a recess 22 of cylindrical form is formed in the housing 6. Preferably, a reservoir tube 24 is located within the recess 22, and the axes of the recess 22 and reservoir tube 24 are parallel to the sealing surface 12. Preferably, the reservoir tube 24 is an annular component. Preferably, a tube seal 26 provides sealing between the recess 22 and the reservoir tube 24. Preferably, the tube seal 26 is exposed to the barrier fluid 18 on one side and to the process fluid 20 on the other side, and partitions the barrier fluid 18 from the process fluid 20. Although the tube seal 26 is illustrated as being located in a seal groove formed in the reservoir tube 24, the seal groove for the tube seal 26 could alternately be formed in the housing 6. Within this specification, when something is said to be exposed to a fluid or lubricant, it is contacted by the fluid or lubricant.

A pressure compensation piston 28 is preferably located at least partially within the reservoir tube 24. A piston seal 30 is preferably provided to establish sealing between the pressure compensation piston 28 and the reservoir tube 24. The piston seal 30 is preferably located by a piston seal groove 32 of annular form that is formed in the pressure compensation piston 28 and faces radially outward. The piston seal 30 is preferably exposed to the barrier fluid 18 on one side and to the process fluid 20 on the other side, and preferably partitions the barrier fluid 18 from the process fluid 20. The pressure compensation piston 28 is axially movable within the reservoir tube 24 within a predetermined range of movement, and this movement allows the pressure compensation piston 28 to pressurize the barrier fluid 18 to approximately the same pressure as the process fluid 20. The use of a piston in this general manner is commonly referred to as pressure balancing, or pressure compensation. The pressure balancing task can also be accomplished with a diaphragm or bladder, if desired. As a consequence of the pressure of the barrier fluid 18 being about the same as the process fluid pressure of the process fluid 20, the outboard dynamic seal 16 is exposed to little differential pressure, and the inboard dynamic seal 14 is exposed to roughly the same differential pressure as exists between the process fluid 20 and the bearing lubricant 10. Since the inboard dynamic seal 14 is exposed to relatively clean bearing lubricant 10 on one side and to relatively clean barrier fluid 18 on the other, it is protected from the abrasives that are present in the process fluid 20. This is an ideal situation for a dynamic seal that is exposed to, and required to withstand, significant differential pressure. Since the outboard dynamic seal 16 is exposed to little differential pressure, it is in an ideal situation for a lip type dynamic seal that is exposed to, and required to resist, any abrasive content of the process fluid 20.

The pressure compensation piston 28 serves as a movable partition having a predetermined range of movement that is located between the barrier fluid 18 and the process fluid 20 and causes the barrier fluid pressure to approximate the process fluid pressure when the movable partition is operating within its predetermined range of movement. The use of a pressure compensation piston 28 for balancing the pressure of the barrier fluid 18 to the pressure of the process fluid 20 is known in the prior art, as is the use of a diaphragm or bladder.

The reservoir tube 24 is preferably retained within the recess 22 by a tube retaining ring 34, which may be of the spring type as shown, or threaded. Alternately, the reservoir tube 24 could be threaded to the housing 6. The reservoir tube 24 preferably mounts a transverse pin 36 that serves as a piston stop, to retain the pressure compensation piston 28 within the reservoir tube 24 during filling of the barrier fluid 18, and during periods where the pressure of the barrier fluid 18 is greater than the process fluid pressure of the process fluid 20. If desired, the piston stop function can be served by some other suitable component, such as a ring that could be secured by tube retaining ring 34. Preferably, the piston stop (illustrated here as transverse pin 36) establishes the predetermined axial movement of the pressure compensation piston 28 in one axial direction, and the closed end of the recess 22 establishes the predetermined axial movement of the pressure compensation piston 28 in the other axial direction.

Preferably, the reservoir tube 24 has a recessed annular surface 38 that forms an annular passageway 40 radially between the annular surface 38 and the recess 22. Preferably, the piston seal 30 has a sealed relationship with a tube bore 42 of the reservoir tube 24. Preferably, the tube bore 42 is a radially inward-facing cylindrical surface that encircles at least part of the pressure compensation piston 28. An end of the reservoir tube 24 preferably has notches 44 to communicate barrier fluid 18 and the barrier fluid pressure from within the tube bore 42 to the annular passageway 40. Preferably, the notches 44 form openings in the tube bore 42 and in the recessed annular surface 38. The housing 6 preferably has a fluid hole 45 to communicate the barrier fluid 18 and the barrier fluid pressure from the annular passageway 40 to the annular region between the inboard dynamic seal 14 and the outboard dynamic seal 16. Preferably, an end of the fluid hole 45 forms an opening in the recess 22, and an opposite end of the fluid hole 45 faces radially inward toward the sealing surface 12.

The inboard dynamic seal 14 is preferably selected from the group of rotary seals that have hydrodynamic features (typically referred to as waves) that in at least some pressure conditions force (i.e., pump) a film of the bearing lubricant 10 into the dynamic sealing interface between the inboard dynamic seal 14 and the sealing surface 12 of the shaft 4 when relative rotation exists between the shaft 4 and the inboard dynamic seal 14. In addition to lubricating the dynamic sealing interface, the hydrodynamic features preferably produce a hydrodynamic pumping-related movement of bearing lubricant 10 into the barrier fluid 18 and into the barrier fluid chamber 21, even though the barrier fluid pressure is typically greater than the bearing lubricant pressure.

In FIG. 1B (and in FIG. 1A), the inboard dynamic seal 14 is illustrated as a KLS-brand lip seal that is marketed by Kalsi Engineering, Inc. ("KLS" is a registered trademark of Kalsi Engineering, Inc.). A hydrodynamic wave of this type of seal is identified by the reference number 46. With this specific type of hydrodynamic seal, a trailing edge portion of the hydrodynamic wave 46 is urged into contact with sealing surface 12 by differential pressure acting across the inboard dynamic seal 14. This wave form is disclosed in commonly assigned U.S. Pat. No. 9,121,503, which is titled, "Rotary seal with supported inlet".

The sectional views herein are intended to be interpreted by the standard conventions of multi and sectional view orthographic drawing projection practiced in the United States and described in ANSI Y14.3-1975, an industry standardization document promulgated by ASME. Section 3-4.2.1 of ANSI Y14.3-1975 has been interpreted to mean that the circumferentially solid portions of the inboard dynamic seal 14 should be crosshatched in sectional view, while the hydrodynamic wave 46 should be drawn in outline form without crosshatch lines to avoid conveying a false impression of circumferential solidity. This ASME Section 3-4.2.1-based cross-sectional illustration technique has been employed within the sealing industry in this manner for many years. For example, see FIG. 1A of U.S. Pat. No. 9,121,503, and FIGS. 8 and 8A of U.S. Pat. No. 6,685,194.

Other types of hydrodynamic seals, which are also appropriate for use in the sealing arrangement 2, have hydrodynamic waves that always remain engaged with the sealing surface 12, even when little or no differential pressure acts across the seal. An example of such a seal is the BDRP-brand seal that is marketed by Kalsi Engineering, Inc. ("BDRP" is a trademark of Kalsi Engineering, Inc.). Both the KLS-brand and BDRP-brand seals are suitable for use as the inboard dynamic seal 14 of the sealing arrangement 2. When a BDRP-brand seal is used as the inboard dynamic seal 14, it will have a higher pumping action in low differential pressure conditions, compared to when a KLS-brand seal is used as the inboard dynamic seal 14, because the hydrodynamic waves of the BDRP-brand seal are already in contact with the sealing surface 12 in low differential pressure conditions. The BDRP-brand seal is disclosed in commonly assigned International Application No. PCT/US2018/32405.

Examples of other hydrodynamic seals that would be appropriate for use as the inboard dynamic seal 14 are provided in U.S. Pat. Nos. 7,562,878, 8,056,904, and 9,086,151.

Because this hydrodynamic pumping action is pumping bearing lubricant 10 into the barrier fluid 18, the pumping action moves the pressure compensation piston 28 axially until the pressure compensation piston 28, reaching the limit of its predetermined range of motion, contacts and is halted by the transverse pin 36. Once the motion limit is reached, the pumping action eventually tends to raise the barrier fluid pressure of the barrier fluid 18 above the process fluid pressure of the process fluid 20, creating a differential pressure situation across the outboard dynamic seal 16. If the outboard dynamic seal 16 is a lip-type seal, such as a KLS-brand seal that is illustrated as the outboard dynamic seal 16, the outboard dynamic seal 16 will vent at some level of differential pressure, allowing some of the barrier fluid 18 to escape into the process fluid 20. The result would be a gradual, but nevertheless undesirable, loss of bearing lubricant 10 over time, caused by the hydrodynamic pumping action of the inboard dynamic seal 14.

It should be understood that when a KLS-brand lip seal is used as the outboard dynamic seal 16, its hydrodynamic waves do not normally contact the shaft 4 unless the inboard dynamic seal 14 fails (or the valve described below fails), exposing the outboard dynamic seal 16 to differential pressure resulting from the process fluid pressure being greater than the bearing lubricant pressure.

In RCD design, and in the design of other types of equipment, it would be desirable if there were little or no loss of the bearing lubricant 10 due to the hydrodynamic pumping action of the inboard dynamic seal 14. The sealing arrangement 2 is configured to minimize or eliminate the loss of bearing lubricant 10.

It should be understood that in the sealing arrangement 2, it is not necessary that the outboard dynamic seal 16 be a lip seal that is capable of venting at some level of differential pressure acting across it. The sealing arrangement 2 functions in the same manner if the outboard dynamic seal 16 is not capable of venting due to differential pressure acting across it. Some machine designers may find it convenient to use the same hydrodynamic lip seal as the inboard dynamic seal 14 and the outboard dynamic seal 16, to simplify logistics, and so that the outboard dynamic seal 16 can operate hydrodynamically if the inboard dynamic seal 14 fails. Other machine designers may desire that the outboard dynamic seal 16 be a different seal, as a matter of choice that may be based on factors such as cost. For example, the outboard dynamic seal 16 could be a non-hydrodynamic lip seal that is energized by a spring or energized by an elastomeric element such as an O-ring. Examples of such seals are disclosed in U.S. Pat. Nos. 3,901,517, 4,067,407, 4,193,606, 4,328,972, 6,736,404, and 6,883,804. For another example, the outboard dynamic seal 16 could be a direct compression type of seal, such as one of the seals disclosed by U.S. Pat. Nos. 5,230,520, 5,738,358, 6,036,192, 6,120,036, 6,315,302, 6,382,634, 6,494,462, 7,052,020, 7,770,898, 8,075,000, 8,550,467, 9,103,445, and 9,121,503.

Referring again to FIG. 1A, a valve is identified generally at 48. The purpose of valve 48 is to allow the hydrodynamic pumping-related increase in the barrier fluid pressure of the barrier fluid 18 to force barrier fluid 18 into the bearing lubricant 10, to compensate for the bearing lubricant 10 being pumped into the barrier fluid 18, and to reduce or prevent the loss of barrier fluid 18 past the outboard dynamic seal 16 and into the process fluid 20, so that the loss of bearing lubricant 10 is reduced or eliminated. The use of the valve 48 is particularly beneficial when the hydrodynamic pumping rate of the inboard dynamic seal 14 is high. For example, the hydrodynamic pumping rate of the inboard dynamic seal 14 may be greater in cold weather conditions, because of the associated increase in the viscosity of the bearing lubricant 10.

The valve 48 is preferably located within a valve recess 50 defined by the housing 6 and retained within the valve recess 50 by a valve retaining ring 51. It should be understood that the valve retaining ring 51 can be a spring-type ring as shown, or can be threaded to the housing 6. Alternately, a component of the valve 48 could have threads that engage mating threads formed by the housing 6. Other ways of mounting and retaining the valve 48 may be used if desired. For example, the valve 48 could be mounted on a surface of the housing 6 with screws. The valve recess 50 is preferably an internal surface of the housing 6.

An inlet passageway 52 is preferably provided to communicate barrier fluid 18 from the region between the inboard dynamic seal 14 and outboard dynamic seal 16 to the valve recess 50 and the valve 48. Preferably, the inlet passageway 52 is formed in the housing 6. An outlet passageway 54 is preferably provided to communicate from the valve recess 50 and the valve 48 to the bearing chamber 13 portion of the housing 6 that contains the bearing 8.

The valve recess 50 preferably includes a stepped bore 56 that has a reduced diameter. The valve 48 preferably incorporates a first body component 58 and a second body component 60, and the second body component 60 is preferably threadedly retained to the first body component 58, such as by body threads 61. Preferably, the first body component 58 and the second body component 60 are annular components that are located at least partially within the valve recess 50. If desired, the first body component 58 or the second body component 60 could have threads that engage mating threads formed by the housing 6, in order to retain the valve 48 within the valve recess 50.

In FIG. 1A, the second body component 60 is retained to the first body component 58 by body threads 61, however a pattern of screws could also be used to retain the second body component 60 to the first body component 58. A first body seal 62 and second body seal 64 preferably establish sealing between the valve 48 and the valve recess 50. Preferably, the first body seal 62 contacts, is compressed between, and provides sealing between the first body component 58 and a larger diameter portion of the valve recess 50 (i.e., larger relative to the stepped bore 56) and preferably the second body seal 64 contacts, is compressed between, and provides sealing between the second body component 60 and the stepped bore 56 of the valve recess 50. In other words, because the valve recess 50 is part of the housing 6, one can accurately state that preferably, the first body seal 62 contacts, is compressed between, and provides sealing between the first body component 58 and the housing 6, and the second body seal 64 contacts, is compressed between, and provides sealing between the second body component 60 and the housing 6.

The first body seal 62 partitions the barrier fluid 18 from the process fluid 20, and the second body seal 64 partitions the barrier fluid 18 from the bearing lubricant 10. The barrier fluid 18 and the barrier fluid pressure is communicated from the sealed region between the inboard dynamic seal 14 and the outboard dynamic seal 16 to the sealed region between the first body seal 62 and second body seal 64 by the inlet passageway 52. The first body component 58 preferably has an inlet port 66 that is oriented in a generally radial direction. Preferably, the inlet port 66 is in fluid communication with the inlet passageway 52 and the barrier fluid chamber 21. This fluid communication preferably allows the barrier fluid 18 and the barrier fluid pressure to communicate from the barrier fluid chamber 21 to the inlet port 66.

FIG. 1C is an enlargement of the valve area that is shown in FIG. 1A. If desired, the inlet port 66 can be formed at a longitudinal slot 68. The first body component 58 may have a recess 70 that may be annular, as shown. Preferably, the longitudinal slot 68 communicates between the inlet port 66 and the annular recess 70, and preferably the annular recess 70 communicates with the inlet port 66, no matter what the angular orientation of the first body component 58 within the valve recess 50. Preferably, the longitudinal slot 68 forms an opening in the recess 70.

Preferably, a valve stem 72 is located at least partially within the first body component 58 and forms a spring shoulder 74 and also forms a seat pocket that preferably includes a seat pocket floor 76 and a seat pocket wall 77. Preferably, a movable seat 78 is located at least partially within the seat pocket.

Preferably the second body component 60 mounts or includes a stationary seat 84 that engages the movable seat 78 when the valve is closed. Preferably, the first body component 58 incorporates an internal body shoulder 86 that faces in a generally axial direction. Preferably, a compression spring 88 is mounted between, contacts, and is compressed in a generally axial direction between the internal body shoulder 86 and the spring shoulder 74, urging the valve stem 72 in a generally axial direction toward the second body component 60 and thus causing the movable seat 78 to contact and initiate sealing with the stationary seat 84. Preferably, the stationary seat 84 is stationary relative to the housing 6. Preferably, the compression spring 88 encircles and is guided laterally by at least a portion of the valve stem 72. Preferably, at least a portion of the valve stem 72 is encircled by the compression spring 88.

Preferably, a valve control piston 90 is secured to the valve stem 72 by any suitable means, such as the illustrated threaded fastener 92. Other suitable retention means are possible, such as one or more retaining rings. Designs are possible where the valve control piston 90 is integral to the valve stem 72, and the spring shoulder 74 is detachable from the valve stem 72. Preferably, however the valve control piston 90 secured, whether integral with or separable from the valve stem 72, the valve control piston 90 has a sealed relationship with the valve stem 72. In FIG. 1C, this sealed relationship is provided by a stem seal 94 that partitions the process fluid 20 from the barrier fluid 18.

The valve control piston 90 and movable seat 78 are parts of a movable assembly, shown generally at 93, that is axially movable relative to the stationary seat 84, the housing 6, and an outlet port 100. Preferably, if the valve stem 72 is separable from the valve control piston 90, the movable assembly 93 may also include the valve stem 72, the stem seal 94, and the threaded fastener 92 (or other suitable means retaining the valve control piston 90 and valve stem 72 together). Arrangements are possible where the movable assembly 93 does not include the valve stem 72, the stem seal 94, or the threaded fastener 92. For example, with rearrangement, the movable seat 78 could be mounted in the valve control piston 90, and the compression spring 88 could be mounted in the process fluid 20 and push on the valve control piston 90. For another example, the valve stem 72 could be an integral axial extension of the valve control piston 90, and the spring shoulder 74 could be a detachable component that is secured to the valve stem 72 with a retaining ring or threads or other suitable means.

Preferably, at least a portion of the first body component 58 is located radially outward of and encircles at least a portion of the movable assembly 93. Preferably, either the first body component 58 or the second body component 60 forms a guide bore 80 that faces in a generally radially inward direction toward the spring shoulder 74, and preferably the spring shoulder 74 forms a stem guiding surface 82 that faces in a generally radially outward direction toward the guide bore 80, and by virtue of its clearance fit with the guide bore 80 locates an end of the valve stem 72 radially. In other words, at least one of the first and second body components defines a guide bore 80 facing radially inward toward and encircling at least a portion of the movable assembly 93, providing lateral guidance to a portion of the movable assembly 93.

The previously described axial compression of the compression spring 88 produces a generally axially acting force that acts on the movable assembly 93 in a generally axial direction toward the stationary seat 84 and the outlet port 100. In FIG. 1C, this spring force is transmitted to the valve control piston 90 via the spring shoulder 74, the valve stem 72, and the threaded fastener 92. Arrangements are possible where the compression spring 88 is immersed in the process fluid 20 and pushes directly on the valve control piston 90, but the illustrated environment is preferred because the compression spring 88 is immersed in the clean environment provided by the barrier fluid 18.

If desired, a control piston seal 96 contacts and provides sealing between the first body component 58 and the movable assembly 93. As illustrated, the control piston seal 96 can be located by a piston seal groove 98 that is annular and formed in the first body component 58 and faces radially inward. Alternately, the control piston seal 96 could be located by a groove formed in the valve control piston 90 that faces radially outward. Regardless of which component the control piston seal 96 is located by, the control piston seal 96 partitions the barrier fluid 18 from the process fluid 20, so that the process fluid pressure of the process fluid 20 acts on the movable assembly 93 in a direction toward the stationary seat 84, and so that the barrier fluid pressure of the barrier fluid 18 acts on the movable assembly 93 in a direction away from the stationary seat 84. If the barrier fluid pressure of the barrier fluid 18 increases over the process fluid pressure of the process fluid 20 to the extent necessary to overcome the axial force of the compression spring 88 and move the movable seat 78 or a portion thereof slightly away from the stationary seat 84, a small amount of barrier fluid 18 flows between the seats 78, 84 and into the bearing lubricant 10. This is known as cracking the seat. This flow is driven by the difference in pressure between the barrier fluid 18 and the bearing lubricant 10. With a slight amount of such flow, the barrier fluid pressure of the barrier fluid 18 drops, allowing the compression spring 88 to reseat the movable seat 78 against the stationary seat 84, which halts the flow of the barrier fluid 18 into the bearing lubricant 10. If the barrier fluid pressure of the barrier fluid 18 becomes lower than the process fluid pressure of the process fluid 20 as a result of the flow of the barrier fluid 18 into the bearing lubricant 10, the axial force resulting from the difference in pressure between the process fluid 20 and the barrier fluid 18 provides additional seating force between the movable seat 78 and the stationary seat 84. Preferably, the seats crack open before the barrier fluid pressure causes the barrier fluid 18 to vent past the outboard dynamic seal 16 and into the process fluid. The valve 48 helps to keep the barrier fluid pressure approximately equal to the process fluid pressure, even though the movable partition described previously has reached its predetermined limit of travel motion.

The control piston seal 96 is preferably in radial compression between the first body component 58 and the valve control piston 90 of the movable assembly 93. The control piston seal 96 contacts and produces a sealed relationship between the first body component 58 and the movable assembly 93, and more specifically produces a sealed relationship between the first body component 58 and the valve control piston 90 of the movable assembly 93. This sealed relationship creates a first pressure area acted on by the process fluid pressure and creates a second pressure area acted on by the barrier fluid pressure. The process fluid pressure acting on the first pressure area produces a first axial force acting on the movable assembly 93 in a generally axial direction toward the stationary seat 84. The barrier fluid pressure acting on the second pressure area produces a second axial force acting on the movable assembly 93 in a generally axial direction away from the stationary seat 84. It should be understood that the second pressure area does not include the small sealed area established by sealing contact between the movable seat 78 and the stationary seat 84, this small sealed area being subtractive from the second sealed area. It should also be understood that the aforementioned first and second axial forces are hydraulic forces.

Preferably, the outlet port 100 has first and second generally oppositely facing open ends. Preferably, as shown in FIG. 1C, the stationary seat 84 encircles and is located radially outward from an axially-facing end of the outlet port 100 (The outlet port 100 accommodates the flow of the barrier fluid 18 into the bearing lubricant 10 when the seat cracks open.) As a result of the valve 48 functioning as described, the net loss of the bearing lubricant due to the hydrodynamic pumping action of the inboard dynamic seal 14 is essentially zero, allowing the sealing arrangement 2 to operate for long periods of time without the need to replenish the bearing lubricant 10. This elimination or significant reduction of the hydrodynamic pumping-related loss of bearing lubricant 10 is highly desirable in an RCD, and is also useful in other types of equipment having movable shafts.

As shown in FIG. 1A, the outlet port 100 is exposed to the bearing lubricant 10 and the bearing lubricant pressure, and preferably has first and second open ends that face in opposite axial directions. As shown in FIG. 1A, the outlet port 100 is preferably in fluid communication with the previously described bearing chamber 13. Preferably, this fluid communication is accomplished by the axial clearance between the valve 48 and the housing 6, and by the outlet passageway 54; however, this fluid communication can take the form of any suitable passage or passages that allow communication of the bearing lubricant 10 and the bearing lubricant pressure between the outlet port 100 and the bearing chamber 13.

Preferably, the valve control piston 90 is axially movable relative to the housing 6, the stationary seat 84, and the outlet port 100.

As shown in FIG. 1C, the stationary seat 84 can be detachable from the second body component 60 for ease of machining, and to allow the seat 84 to be replaced without replacing the entire second body component 60. In FIG. 1C, the stationary seat 84 is threadedly retained to the second body component 60 and is sealed with respect to the second body component 60 by a static seal 102. In FIG. 1C, the stationary seat 84 can, if desired, be incorporated as part of a seat component 104 that is formed generally like a U.S. Military Standard MS33656 tube fitting and is threadedly attached to a MS16142-type boss that forms the female threads and the pocket for the static seal 102. Shouldering contact between the second body component 60 and a flange surface 106 of the seat component 104 can be used to axially position the stationary seat 84. The seat threads that may be used to retain the seat component 104 to the second body component 60 are identified by reference number 108. The seat component 104 with its stationary seat 84 can be thought of as an optionally removable part of the second body component 60. If desired, the stationary seat 84 can be integral to the second body component 60, as will be shown in other figures.

If desired, the second body component 60 can incorporate spanner pockets 110 that are engaged by a spanner wrench when assembling the second body component 60 to the first body component 58. If desired, the valve stem 72 can have an engagement hole 112 that can be engaged by a radially oriented pin (not shown) to provide reactive torque when tightening the threaded fastener 92. If desired, the inlet port 66 can be engaged by a radially oriented pin when assembling the second body component 60 to the first body component 58, and when installing the seat component 104. Preferably, the engagement hole 112 is generally radially oriented, and is alignable (i.e. can be aligned with) the inlet port 66 during assembly of the valve 48, so that the radially oriented pin can engage both the inlet port 66 and the engagement hole 112 during assembly of the valve 48, if needed to prevent rotation of the valve stem 72 when tightening the threaded fastener 92.

Preferably, the seat component 104 includes a hex pocket 114 that effectively forms a part of the outlet port 100 and is engaged by a hex wrench when installing the seat component 104.

If desired, the valve control piston 90 can include a purchase flange 116 that can be used to retract the valve stem 72 slightly when installing the seat component 104. The purchase flange 116 can also be pulled on to remove the valve control piston 90 when disassembling the valve 48.

Referring to FIG. 1C, the internal body shoulder 86 preferably faces in a generally axial direction toward the spring shoulder 74 and the second body component 60. Preferably, the internal body shoulder 86 faces generally away from the valve control piston 90. Preferably, the internal body shoulder 86 is located radially outward from, and encircles, a portion of the valve stem 72. Preferably, the internal body shoulder 86 faces in a generally axial direction toward and contacts the compression spring 88.

Preferably, the internal body shoulder 86 is a generally axially-facing surface of a spring shelf 118. If desired, the spring shelf 118 may be integral to the first body component 58, as shown. Alternately, the spring shelf 118 could be separable from the first body component 58, if desired. For example, the spring shelf 118 could be a removable ring that is axially located by a retaining ring. Preferably, the spring shelf 118 is located radially outward from, and encircles a portion of the valve stem 72, as shown. Preferably, the spring shelf 118 has a shelf bore 120 that faces in a generally radial direction toward the valve stem 72. Preferably, the inlet port 66 is a generally radially-oriented hole that penetrates through the spring shelf 118 and forms a generally radial facing opening in the shelf bore 120 that faces toward the valve stem 72. Preferably, the engagement hole 112 is located at an axial position that is approximately the same as the axial position of the inlet port 66, so that a pin can temporarily engage both the engagement hole 112 and the inlet port 66 during assembly of the valve 48, to prevent the valve stem 72 from rotating relative to the first body component 58 when tightening the threaded fastener 92.

As shown in FIG. 1C, the spring shoulder 74 preferably has a shoulder surface 122 that faces in a generally axial direction toward the internal body shoulder 86 and the valve control piston 90. The shoulder surface 122 preferably faces toward and contacts the compression spring 88, the compression spring 88 being axially compressed by and between the shoulder surface 122 and the internal body shoulder 86. The axial distance between the spring shoulder 74 and the internal body shoulder 86 is preferably less than the uncompressed length of the compression spring 88. The shoulder surface 122 preferably faces in a generally axial direction toward the spring shelf 118. The spring shoulder 74 may be located axially between a portion of the second body component 60 and the compression spring 88, as shown. The spring shoulder 74 may be located axially between a portion of the second body component 60 and the internal body shoulder 86, as shown. The spring shoulder 74 may be located axially between a portion of the second body component 60 and the spring shelf 118, as shown. The spring shoulder 74 may be located axially between a portion of the second body component 60 and the valve control piston 90, as shown.

Preferably, the compression spring 88 is a coil spring, as shown. Although the compression spring 88 is illustrated as being made from round wire spring stock, other types of spring stock can be used to produce the compression spring 88, if desired. Although the compression spring 88 is preferably a coil spring, other types of compression springs may be substituted if desired, such as one or a stack of multiple disk springs.

The compression spring 88 is preferably located radially outward from and encircles a portion of the valve stem 72, as shown. The compression spring 88 is preferably located axially between the spring shoulder 74 and the internal body shoulder 86. The compression spring 88 may be located radially between a portion of the second body component 60 and a portion of the valve stem 72, as shown. The compression spring 88 may be located radially between a portion of the first body component 58 and a portion of the valve stem 72, as shown. The compression spring 88 may be located axially between a portion of the second body component 60 and a portion of the first body component 58, as shown. The compression spring 88 may be located axially between a portion of the second body component 60 and a portion of the valve control piston 90, as shown. The compression spring 88 may be located axially between the spring shoulder 74 and the spring shelf 118, as shown. The compression spring 88 may be located axially between the spring shoulder 74 and the valve control piston 90, as shown.

The first body seal 62 is preferably located in a first body seal groove 124 that is formed in the first body component 58 and faces radially outward toward the valve recess 50, as shown. Alternately, the first body seal 62 could be mounted in a radially inward-facing body seal groove that is formed in the housing 6. Configurations are possible where the first body seal 62 is a face seal or part of a diaphragm.

The second body seal 64 is preferably mounted in a second body seal groove 125 that is formed in the second body component 60 and faces radially outward toward the stepped bore 56 portion of the valve recess 50, as shown. Alternately, the second body seal 64 could be mounted in a radially inward-facing second body seal groove that is formed in the housing 6. Configurations are possible where the second body seal 64 is a face seal.

The first body seal 62, second body seal 64, stem seal 94, control piston seal 96, and static seal 102 are preferably made out of resilient polymeric sealing material, such as an elastomer, and may be O-rings, as shown. Other types of seals may be used in place of the O-rings that are illustrated, such as square rings, O-ring energized lip seals, etc.

The seat pocket floor 76 preferably faces in a generally axial direction toward the movable seat 78 and the stationary seat 84, and generally away from the valve control piston 90. The seat pocket wall 77 preferably faces in a generally radially inward direction toward the movable seat 78 and generally away from the spring shoulder 74. The seat pocket wall 77 preferably adjoins the seat pocket floor 76. The movable seat 78 is preferably located axially between the seat pocket floor 76 and the stationary seat 84. Preferably, the movable seat 78 is made from a polymer such as plastic or elastomer.

In this specification, the definition of the words "adjoin", "adjoins", and "adjoining" includes the commonly accepted "adjoin" definition "to be close to or in contact with one another" that is provided by the Merriam-Webster online dictionary for the word "adjoin". Although this definition is provided herein, this is not an example of the inventor being his own lexicographer, since the definition given is simply the commonly understood and accepted definition.

Preferably, the movable seat 78 has a seating surface 126 that faces in a generally axial direction toward and adjoining the stationary seat 84, and is generally planar in shape. Preferably, the seating surface 126 faces in a generally axial direction toward the outlet port 100. The seating surface 126 preferably faces in a generally axial direction away from the seat pocket floor 76, and away from the valve control piston 90, and away from the engagement hole 112 in the valve stem 72.

The valve 48 is of the "normally closed" variety of valves, and the seating surface 126 normally contacts the stationary seat 84, producing a sealed relationship with the stationary seat 84. The stationary seat 84 is preferably an end surface of an axially projecting annular portion of the seat component 104, as shown. The stationary seat 84 is annular in form and is preferably a generally ring-shaped flat surface. Preferably, the barrier fluid 18 is in fluid communication with the barrier fluid chamber 21 and with the seating surface 126 of the movable seat 78. Preferably, the barrier fluid pressure is in pressure communication with the barrier fluid chamber 21 and with the seating surface 126 of the movable seat 78.

The movable seat 78, the valve control piston 90, and the valve stem 72 are preferably axially movable together, relative to the housing 6, the stationary seat 84, and the outlet port 100.

The axial force produced by the axial compression of the compression spring 88 helps to load the seating surface 126 against the stationary seat 84, keeping the valve 48 in a normally closed condition. When the process fluid pressure of the process fluid 20 is greater than the barrier fluid pressure of the barrier fluid 18, the resulting differential pressure acting on the valve control piston 90 creates an axial force on the valve stem 72 acting toward the stationary seat 84, which augments the axial force produced by the compression spring 88, and assists in holding the seating surface 126 in sealed contact with the stationary seat 84.

When the process fluid pressure of the process fluid 20 is less than the barrier fluid pressure of the barrier fluid 18, the resulting differential pressure acting on the valve control piston 90 creates an axial force on the valve stem 72 acting away from the stationary seat 84, which opposes the axial force produced by the compression spring 88. When this differential pressure is great enough, the seating surface 126 no longer has a sealed relationship with the stationary seat 84, and the barrier fluid pressure of the barrier fluid 18 causes a small amount of the barrier fluid 18 to escape by flowing or seeping into the bearing lubricant 10. This small amount of flow drops the barrier fluid pressure of the barrier fluid 18 below the process fluid pressure of the process fluid 20, and the seating surface 126 once again establishes sealing contact with the stationary seat 84.

Referring briefly back to FIG. 1A, one of the key benefits of using the valve 48, instead of a simple check valve or pressure relief valve, is that the valve 48 remains closed if the inboard dynamic seal 14 or the outboard dynamic seal 16 fails, which allows the surviving seal to partition the process fluid 20 and the process fluid pressure of the process fluid 20 from the bearing lubricant 10 and the bearing lubricant pressure of the bearing lubricant 10.

Referring back to FIG. 1C, preferably, the valve control piston 90 is an annular component that has a first piston end 130 that faces toward and is exposed to the process fluid 20 and the process fluid pressure and faces generally axially away from the stationary seat 84, the outlet port 100, the spring shelf 118, the compression spring 88, the spring shoulder 74, and the second body component 60.

Preferably, the valve control piston 90 also has a second piston end 128 that faces in a generally axial direction toward and is exposed to the barrier fluid 18 and the barrier fluid pressure, and also faces generally toward the stationary seat 84, the outlet port 100, the spring shelf 118, the compression spring 88, the spring shoulder 74, and the second body component 60. Preferably, the inlet port 66 is in fluid communication with at least a portion of the valve stem 72, with at least a portion of the seating surface 126, and with at least a portion of the second piston end 128 of the valve control piston 90.

Preferably, the valve control piston 90 has a piston outer surface 131 that is generally cylindrical and faces generally outward toward and is encircled by a piston recess 132 of the first body component 58. Preferably, the piston recess 132 is located radially outward of, encircles, and faces generally radially inward toward the piston outer surface 131. Preferably, the piston outer surface 131 is in sealed contacting relation with the control piston seal 96. Preferably, the piston outer surface 131 is positioned laterally by its fit with the piston recess 132, allowing the valve control piston 90 to position an end of the valve stem 72 of the movable assembly 93 laterally. This guidance is beneficial to keeping the seating surface 126 substantially parallel with the stationary seat 84, which is desirable in terms of achieving efficient sealing between the seating surface 126 and the stationary seat 84. Preferably, the valve control piston 90 has a stem opening 133 that faces generally radially inward toward and surrounds a portion of the valve stem 72, and faces generally radially inward toward, surrounds, and is in sealed contact with the stem seal 94. Preferably, the stem seal 94 is positioned by a stem seal groove 134 that is formed in the valve stem 72, however a variation is possible where the stem seal groove 134 is formed in the valve control piston 90. It can be appreciated that the close fit between the stem opening 133 and the valve stem 72 contributes to locating the valve stem 72 laterally. The stem opening 133 is preferably substantially concentric with the piston outer surface 131.

Referring again to FIG. 1B, preferably the tube bore 42 is generally cylindrical, and faces radially inward toward the pressure compensation piston 28 and faces generally away from the recess 22 and the annular passageway 40, and is in sealing contact with the piston seal 30. Preferably, a portion of the tube bore 42 is exposed to and contacted by the barrier fluid 18, and a portion of the tube bore 42 is exposed to and contacted by the process fluid 20. Preferably, the pressure compensation piston 28 has a process fluid end 136 that faces toward, is exposed to, and contacts the process fluid 20. Preferably, the pressure compensation piston 28 has a barrier fluid end 138 that faces toward, is exposed to, and contacts the barrier fluid 18. Preferably, the pressure compensation piston 28 also has a piston guide surface 140 that faces radially outward toward, is encircled by, and is laterally guided by the tube bore 42, and is exposed to and contacted by the barrier fluid 18.

Preferably, the recess 22 is a generally cylindrical inwardly-facing surface of the housing 6 that faces toward the pressure compensation piston 28 and the reservoir tube 24. Preferably, the recessed annular surface 38 is a generally cylindrical surface that faces generally radially outward toward the recess 22. Preferably, the notches 44 are in fluid communication with the fluid hole 45. Preferably, the piston seal 30 is located radially between the pressure compensation piston 28 and the tube bore 42.

The inboard dynamic seal 14 is preferably mounted in and located by a pressure seal groove formed in the housing 6 that includes a pressure seal groove bore 142, a pressure seal support wall 144, and a pressure seal capture wall 146. If desired, the pressure seal support wall 144 or the pressure seal capture wall 146 can be separable from the pressure seal groove bore 142, to facilitate installation of the inboard dynamic seal 14. In other words, the pressure seal support wall 144 or the pressure seal capture wall 146 can be removable. Preferably, the pressure seal support wall 144 faces generally toward the inboard dynamic seal 14, and supports the inboard dynamic seal 14 against the differential pressure that occurs when the barrier fluid pressure of the barrier fluid 18 is greater than the bearing lubricant pressure of the bearing lubricant 10. Preferably, the pressure seal support wall 144 and the pressure seal capture wall 146 face in generally axial directions, toward one another. The pressure seal support wall 144 and the pressure seal capture wall 146 preferably adjoin the pressure seal groove bore 142.

The outboard dynamic seal 16 is preferably mounted in and located by a barrier seal groove formed in the housing 6 that includes a barrier seal groove bore 148, a barrier seal support wall 150, and a barrier seal capture wall 152. If desired, the barrier seal support wall 150 or the barrier seal capture wall 152 can be separable from the barrier seal groove bore 148, to facilitate installation of the outboard dynamic seal 16. In other words, the barrier seal support wall 150 or the barrier seal capture wall 152 can be removable. Preferably, the barrier seal support wall 150 faces generally toward the outboard dynamic seal 16 and supports the outboard dynamic seal 16 against the differential pressure that occurs when the process fluid pressure of the process fluid 20 is greater than the barrier fluid pressure of the barrier fluid 18. The barrier seal support wall 150 and the barrier seal capture wall 152 preferably face in generally axial directions, toward one another. Preferably, the barrier seal capture wall 152 contacts and supports the outboard dynamic seal 16 when the barrier fluid pressure of the barrier fluid 18 is greater than the process fluid pressure of the process fluid 20. The barrier seal support wall 150 and the barrier seal capture wall 152 preferably adjoin the barrier seal groove bore 148.

Since the pressure seal groove and the barrier seal groove are preferably formed in the housing 6, it can be said that preferably, the inboard dynamic seal 14 and the outboard dynamic seal 16 are located by the housing 6 and are in sealed contact with both the housing 6 and the shaft 4.

Preferably, the pressure seal capture wall 146 and the barrier seal support wall 150 are surfaces of wall structure 154 that is part of the housing 6 and is located axially between the inboard dynamic seal 14 and the outboard dynamic seal 16. Preferably, the fluid hole 45 passes in a generally radial direction through the wall structure 154 and forms an opening in the recess 22 that faces toward the reservoir tube 24. Preferably, the wall structure 154 is located radially outward of, and encircles, and has radial clearance with respect to the sealing surface 12. Preferably, this radial clearance forms at least part of the barrier fluid chamber 21.

Preferably the pressure seal groove bore 142 and the barrier seal groove bore 148 are generally cylindrical in shape, and face radially inward toward and encircle the sealing surface 12. Preferably, the inboard dynamic seal 14 is located radially between and contacts the pressure seal groove bore 142 and the sealing surface 12. Preferably the outboard dynamic seal 16 is located radially between and contacts the barrier seal groove bore 148 and the sealing surface 12. Preferably, the inboard dynamic seal 14 is located axially between and in intermediate location to the bearing 8 and the outboard dynamic seal 16.

When used in this specification, the word "intermediate" has the ordinary dictionary meaning of, "occurring in the middle of a . . . series" (Merriam-Webster's Learner's Dictionary).

If desired, the inboard dynamic seal 14 may include a pressure seal spring 156 that loads an inner pressure seal lip 158 against the sealing surface 12 and loads an outer pressure seal lip 160 against the pressure seal groove bore 142. The pressure seal spring 156 may be a conventional V-spring, as shown. The outboard dynamic seal 16 may include a barrier seal spring 162 that loads an inner barrier seal lip 164 against the sealing surface 12 and loads an outer barrier seal lip 166 against the barrier seal groove bore 148. Preferably, the inboard dynamic seal 14 and the outboard dynamic seal 16 are made at least in part from polymer. If desired, the polymeric construction of the inboard dynamic seal 14 and the outboard dynamic seal 16 can be a composite construction that includes both plastic and elastomer.

In review, referring again to FIG. 1A, the inboard dynamic seal 14 is preferably a hydrodynamic seal having a hydrodynamic pumping action in response to relative rotation between the shaft 4 and the inboard dynamic seal 14. The hydrodynamic pumping action forces a film of the bearing lubricant 10 between the inboard dynamic seal 14 and the shaft 4 and into the barrier fluid 18. The pumping action causes the barrier fluid pressure to become greater than the process fluid pressure, and the barrier fluid pressure acting on the movable assembly 93 causes at least part of the seating surface 126 of the movable seat 78 to temporarily move in a generally axial direction away from the stationary seat 84, allowing barrier fluid 18 to temporarily pass between the seating surface 126 and the stationary seat 84 and into the outlet port 100, which reduces the barrier fluid pressure, allowing the force of the compression spring 88 to cause the seating surface 126 to reseal against the stationary seat 84.

FIG. 2

Figure 2:
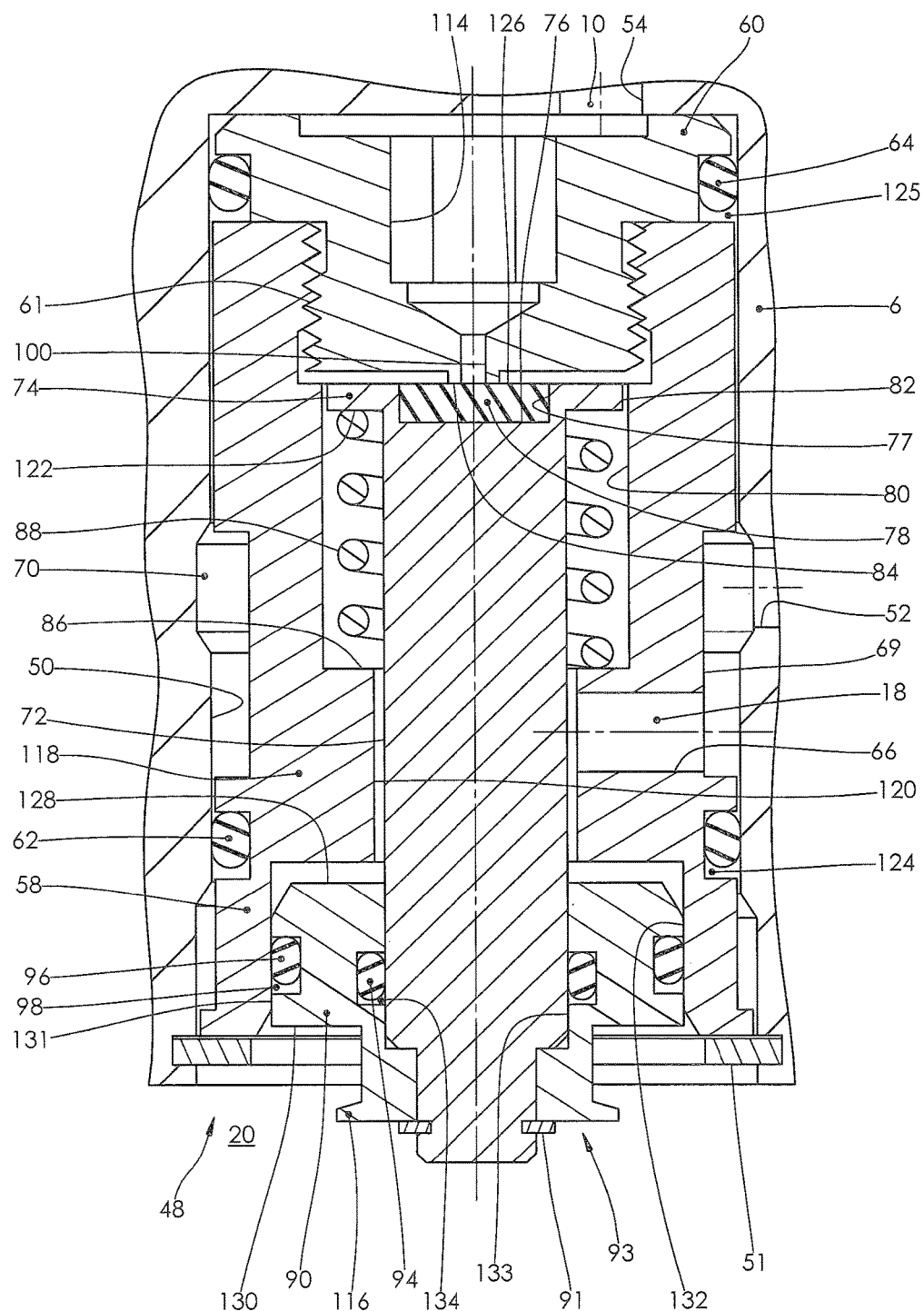
FIG. 2 is a fragmentary cross-sectional view of an alternate embodiment of the valve assembly.

FIG. 2 is a fragmentary cross-sectional view representing a preferred embodiment of the present invention.

A valve is identified generally at 48. The purpose of valve 48 is to allow the increase in the barrier fluid pressure of the barrier fluid 18 to force the barrier fluid 18 into the bearing lubricant 10, to prevent gross hydrodynamic pumping-related loss of bearing lubricant 10. The valve 48 is preferably located within a valve recess 50 of the housing 6, as shown, and may be retained within the valve recess 50 by a valve retaining ring 51. Other ways of mounting and retaining the valve 48 may be used if desired. The valve recess 50 is preferably an internal surface of the housing 6.

Preferably, an inlet passageway 52 is provided in the housing 6 to communicate barrier fluid 18 to the valve recess 50 and the valve 48. Preferably, an outlet passageway 54 is provided in the housing 6 to communicate from the valve recess 50 and the valve 48.

The valve 48 preferably incorporates a first body component 58 and a second body component 60, and the second body component 60 is preferably threadedly retained to the first body component 58, such as with body threads 61. Preferably, the first body component 58 and the second body component 60 are annular components. A first body seal 62 and second body seal 64 preferably establish sealing between the valve 48 and the valve recess 50. Preferably, the first body seal 62 contacts, is compressed between, and seals between the first body component 58 and a portion of the valve recess 50 and preferably the second body seal 64 contacts, is compressed between, and seals between the second body component 60 and a portion of the valve recess 50. Preferably, the first body seal 62 partitions the barrier fluid 18 from the process fluid 20, and the second body seal 64 partitions the barrier fluid 18 from the bearing lubricant 10. Throughout this specification, when a seal is said to partition two fluids, it also partitions the pressures of the two fluids.

The first body component 58 preferably has an inlet port 66 that is oriented in a generally radial direction. If desired, the inlet port 66 can be formed at a wrench flat 69. If desired, the housing 6 may have a recess 70 that may be annular, as shown. Preferably, the wrench flat 69 communicates between the inlet port 66 and the annular recess 70, and preferably the annular recess 70 communicates with the inlet port 66, no matter what the angular orientation of the first body component 58 within the valve recess 50.

Preferably, a valve stem 72 is located at least partially within the first body component 58 and forms a spring shoulder 74 and also forms a seat pocket that preferably includes a seat pocket floor 76 and a seat pocket wall 77. Preferably, a movable seat 78 is located at least partially within the seat pocket. Preferably, either the first body component 58 or the second body component 60 forms a guide bore 80 that faces in a generally radially inward direction toward the spring shoulder 74, and preferably the spring shoulder 74 forms a stem guiding surface 82 that faces in a generally radially outward direction toward the guide bore 80, and by virtue of its clearance fit with the guide bore 80 locates an end of the valve stem 72 radially.

Preferably the second body component 60 mounts or includes a stationary seat 84 that engages the movable seat 78 when the valve 48 is closed. In FIG. 2, the second body component 60 is threadedly retained to the first body component 58 and defines the stationary seat 84.

Preferably the first body component 58 incorporates an internal body shoulder 86 that faces in a generally axial direction. Preferably, a compression spring 88 is mounted between, contacts, and is compressed axially between the internal body shoulder 86 and the spring shoulder 74, urging the valve stem 72 axially toward the second body component 60 and thus causing the movable seat 78 to contact and initiate sealing with the stationary seat 84. Preferably, when the barrier fluid pressure is not greater than the process fluid pressure, the compression spring 88 holds the movable seat 78 in contact with the stationary seat 84.

Preferably, the valve control piston 90 is secured to the valve stem 72 by any suitable means, such as the piston retaining ring 91 that is illustrated. Other suitable retention means are possible, such as a screw or nut. Preferably, the valve control piston 90 has a sealed relationship with the valve stem 72. In FIG. 2, this sealed relationship is provided by a stem seal 94 that partitions the process fluid 20 from the barrier fluid 18.

The valve control piston 90 and movable seat 78 are parts of a movable assembly shown generally at 93 that is axially movable relative to the stationary seat 84, the housing 6, and the outlet port 100. If the valve stem 72 is separable from the valve control piston 90, the movable assembly may also include the valve stem 72, the stem seal 94, and the piston retaining ring 91 (or other suitable means retaining the valve control piston 90 and valve stem 72 together). As shown, the movable assembly 93 may also include the control piston seal 96, if desired.

Preferably, the inlet port 66 communicates the barrier fluid 18 and the barrier fluid pressure to at least a portion of the movable assembly 93. Preferably, the first body component 58 provides lateral guidance to a portion of the movable assembly 93. This could, for example, be provided by the fit between the valve control piston 90 and the first body component 58, or by the fit between the valve stem 72 and the first body component 58.

If desired, a control piston seal 96 contacts and provides sealing between the first body component 58 and the movable assembly 93. As illustrated, the control piston seal 96 can be located by a piston seal groove 98 that is annular and is formed in the valve control piston 90. Preferably, the control piston seal 96 partitions the barrier fluid 18 from the process fluid 20, so that the process fluid pressure of the process fluid 20 acts on the movable assembly 93 in a direction toward the stationary seat 84, and so that the barrier fluid pressure of the barrier fluid 18 acts on the movable assembly 93 in a direction away from the stationary seat 84. If the barrier fluid pressure of the barrier fluid 18 increases over the process fluid pressure of the process fluid 20 to the extent necessary to overcome the axial force of the compression spring 88 and move the movable seat 78 slightly away from the stationary seat 84, a small amount of barrier fluid 18 seeps or flows between the seats and into the bearing lubricant 10. This is known as cracking the seat. This flow is driven by the difference in pressure between the barrier fluid 18 and the bearing lubricant 10. With a slight amount of such flow, the pressure of the barrier fluid 18 drops, allowing the compression spring 88 to reseat the movable seat 78 against the stationary seat 84, which halts the flow of the barrier fluid 18 into the bearing lubricant 10. If the pressure of the barrier fluid 18 becomes lower than the process fluid pressure of the process fluid 20 as a result of the flow of the barrier fluid 18 into the bearing lubricant 10, the axial force resulting from the difference in pressure between the process fluid 20 and the barrier fluid 18 provides additional seating force between the movable seat 78 and the stationary seat 84. Preferably, the seats crack open before the barrier fluid pressure causes the barrier fluid 18 to vent past the outboard dynamic seal 16 and into the process fluid 20.

Preferably, the stationary seat 84 encircles and is located radially outward from an axially-facing end of an outlet port 100. The outlet port 100 accommodates the flow of the barrier fluid 18 into the bearing lubricant 10 when the seats crack open.

If desired, the second body component 60 can incorporate a hex pocket 114 that effectively forms a part of the outlet port 100 and is engaged by a hex wrench when assembling the second body component 60 to the first body component 58.

If desired, the wrench flat 69 can be engaged by wrench or vise when assembling the second body component 60 to the first body component 58. Two wrench flats are shown in FIG. 2, the wrench flat 69 and another unlabeled wrench flat that faces in a direction opposite to the direction the labeled wrench flat 69 faces.

If desired, the valve control piston 90 can include a purchase flange 116 that can be used to retract the valve stem 72 slightly when installing the second body component 60, and to remove the valve control piston 90 when disassembling the valve 48.

Preferably, the internal body shoulder 86 faces in a generally axial direction toward the spring shoulder 74 and the second body component 60, and faces in a generally axial direction away from the valve control piston 90. Preferably, the internal body shoulder 86 is located radially outward from, and encircles, a portion of the valve stem 72. Preferably, the internal body shoulder 86 faces in a generally axial direction toward and contacts the compression spring 88.

Preferably, the internal body shoulder 86 is a generally axially-facing surface of a spring shelf 118 that is integral to the first body component 58 and is located radially outward from and encircles a portion of the valve stem 72. Preferably, the spring shelf 118 has a shelf bore 120 that faces in a generally radially inward direction, toward the valve stem 72, and may give radial guidance to the movable assembly 93. Preferably, the inlet port 66 is a generally radially-oriented hole that penetrates through the spring shelf 118 and forms a generally radially inwardly-facing opening in the shelf bore 120 that faces toward the valve stem 72.

The spring shoulder 74 preferably has a shoulder surface 122 that faces in a generally axial direction toward the internal body shoulder 86 and the valve control piston 90. The spring shoulder 74 preferably faces toward and contacts the compression spring 88, and the compression spring 88 is axially compressed by and between the shoulder surface 122 and the internal body shoulder 86. The axial distance between the spring shoulder 74 and the internal body shoulder 86 is preferably less than the uncompressed length of the compression spring 88. The shoulder surface 122 preferably faces in a generally axial direction toward the spring shelf 118. The spring shoulder 74 may be located axially between a portion of the second body component 60 and the compression spring 88, as shown. The spring shoulder 74 may be located axially between a portion of the second body component 60 and the internal body shoulder 86, as shown. The spring shoulder 74 may be located axially between a portion of the second body component 60 and the spring shelf 118, as shown. The spring shoulder 74 may be located axially between a portion of the second body component 60 and the valve control piston 90, as shown.

Preferably, the compression spring 88 is a coil spring. Although the compression spring 88 is illustrated as being made from round wire spring stock, other types of spring stock can be used to produce the compression spring 88, if desired. Although the compression spring 88 is preferably a coil spring, other types of compression springs may be substituted if desired, such as a disk spring or a stack of disk springs.

The compression spring 88 is preferably located radially outward from and encircles a portion of the valve stem 72, as shown. The compression spring 88 is preferably located axially between the spring shoulder 74 and the internal body shoulder 86. The compression spring 88 may be located radially between a portion of the first body component 58 and a portion of the valve stem 72, as shown. The compression spring 88 may be located axially between a portion of the second body component 60 and a portion of the first body component 58, as shown. The compression spring 88 may be located axially between a portion of the second body component 60 and a portion of the valve control piston 90, as shown. The compression spring 88 may be located axially between the spring shoulder 74 and the spring shelf 118, as shown. The compression spring 88 may be located axially between the spring shoulder 74 and the valve control piston 90, as shown.

The first body seal 62 is preferably located in a first body seal groove 124 that is formed in the first body component 58 and faces radially outward toward the valve recess 50, as shown. Alternately, the first body seal 62 could be mounted in a radially inwardly-facing body seal groove that is formed in the housing 6. Configurations are possible where the first body seal 62 is a face seal.

The second body seal 64 is preferably mounted in a second body seal groove 125 that is partially defined by the second body component 60 and faces radially outward toward the valve recess 50, as shown. Alternately, the second body seal 64 could be mounted in a radially inwardly-facing second body seal groove that is formed in the housing 6. Configurations are possible where the second body seal 64 is a face seal.

The first body seal 62, second body seal 64, stem seal 94, and control piston seal 96 are preferably made out of resilient polymeric sealing material, such as an elastomer, and may, if desired, be O-rings, as shown. The first body seal 62, second body seal 64, stem seal 94, and control piston seal 96 are preferably compressed when installed. If desired, other types of seals may be used in place of the O-rings that are illustrated, such as square rings, O-ring energized lip seals, etc.

The seat pocket floor 76 preferably faces in a generally axial direction toward the movable seat 78 and the stationary seat 84, and generally away from the valve control piston 90. The seat pocket wall 77 preferably faces in a generally radially inward direction toward and adjoining the movable seat 78 and generally away from the spring shoulder 74 and the first body component 58. The seat pocket wall 77 preferably adjoins the seat pocket floor 76. The movable seat 78 is preferably located axially between the seat pocket floor 76 and the stationary seat 84. Preferably, the movable seat 78 is made from a polymer such as plastic or elastomer.

Preferably, the movable seat 78 has a seating surface 126 that faces in a generally axial direction toward the stationary seat 84 and is generally planar in shape. The seating surface 126 preferably faces in a generally axial direction away from the seat pocket floor 76, and away from the valve control piston 90. The valve 48 is of the "normally closed" variety of valves, and the seating surface 126 normally contacts and produces a sealed relationship with the stationary seat 84. The stationary seat 84 may be an end surface of an axially projecting annular portion of the second body component 60, as shown.

The axial force produced by the axial compression of the compression spring 88 helps to load the seating surface 126 against the stationary seat 84, keeping the valve 48 in a normally closed condition. When the process fluid pressure of the process fluid 20 is greater than the pressure of the barrier fluid 18, the resulting differential pressure acting on the valve control piston 90 creates an axial force on the valve stem 72 acting toward the stationary seat 84, which augments the axial force produced by the compression spring 88, and assists in holding the seating surface 126 in sealed contact with the stationary seat 84.

When the process fluid pressure of the process fluid 20 is less than the pressure of the barrier fluid 18, the resulting differential pressure acting on the valve control piston 90 creates an axial force on the movable assembly 93 acting away from the stationary seat 84, which opposes the axial force produced by the compression spring 88. When this differential pressure is great enough, the seating surface 126 no longer has a sealed relationship with the stationary seat 84, and the pressure of the barrier fluid 18 causes a small amount of the barrier fluid 18 to escape by flowing or seeping into the bearing lubricant 10. This small amount of flow drops the pressure of the barrier fluid 18 below the process fluid pressure of the process fluid 20, and the seating surface 126 once again establishes sealing contact with the stationary seat 84. When testing a prototype embodiment of the present invention, the inventor found that the valve arrangement keeps the barrier fluid pressure at a value that is very close to the process fluid pressure.

Preferably, the valve control piston 90 is an annular component that has a first piston end 130 that faces toward and is exposed to the process fluid 20 and faces generally axially away from the spring shelf 118, the compression spring 88, the spring shoulder 74, and the second body component 60. Preferably, the valve control piston 90 also has a second piston end 128 that faces in a generally axial direction toward, and is exposed to, the barrier fluid 18, and also faces generally toward the spring shelf 118, the compression spring 88, the spring shoulder 74, and the second body component 60.

Preferably, the valve control piston 90 has a piston outer surface 131 that is generally cylindrical and faces generally outward toward, and is encircled by, a piston recess 132 of the first body component 58. Preferably, the piston recess 132 is located radially outward of, encircles, and faces generally radially inward toward the piston outer surface 131. Preferably, the valve control piston 90 is in sealed contacting relation with the control piston seal 96. Preferably, the piston outer surface 131 is positioned laterally by its fit with the piston recess 132, allowing the valve control piston 90 to laterally position an end of the valve stem 72 of the movable assembly 93. This guidance is beneficial to keeping the seating surface 126 substantially parallel with the stationary seat 84, which is desirable in terms of achieving sealing between the seating surface 126 and the stationary seat 84. Preferably, the valve control piston 90 has a stem opening 133 that faces generally radially inward toward, and surrounds a portion of, the valve stem 72.

The stem seal 94 may be positioned by a stem seal groove 134 that may be formed in the valve control piston 90. It can be appreciated that the close fit between the stem opening 133 and the valve stem 72 contributes to locating the valve stem 72 laterally. The stem opening 133 is preferably substantially concentric with the piston outer surface 131.

Figure 3A:
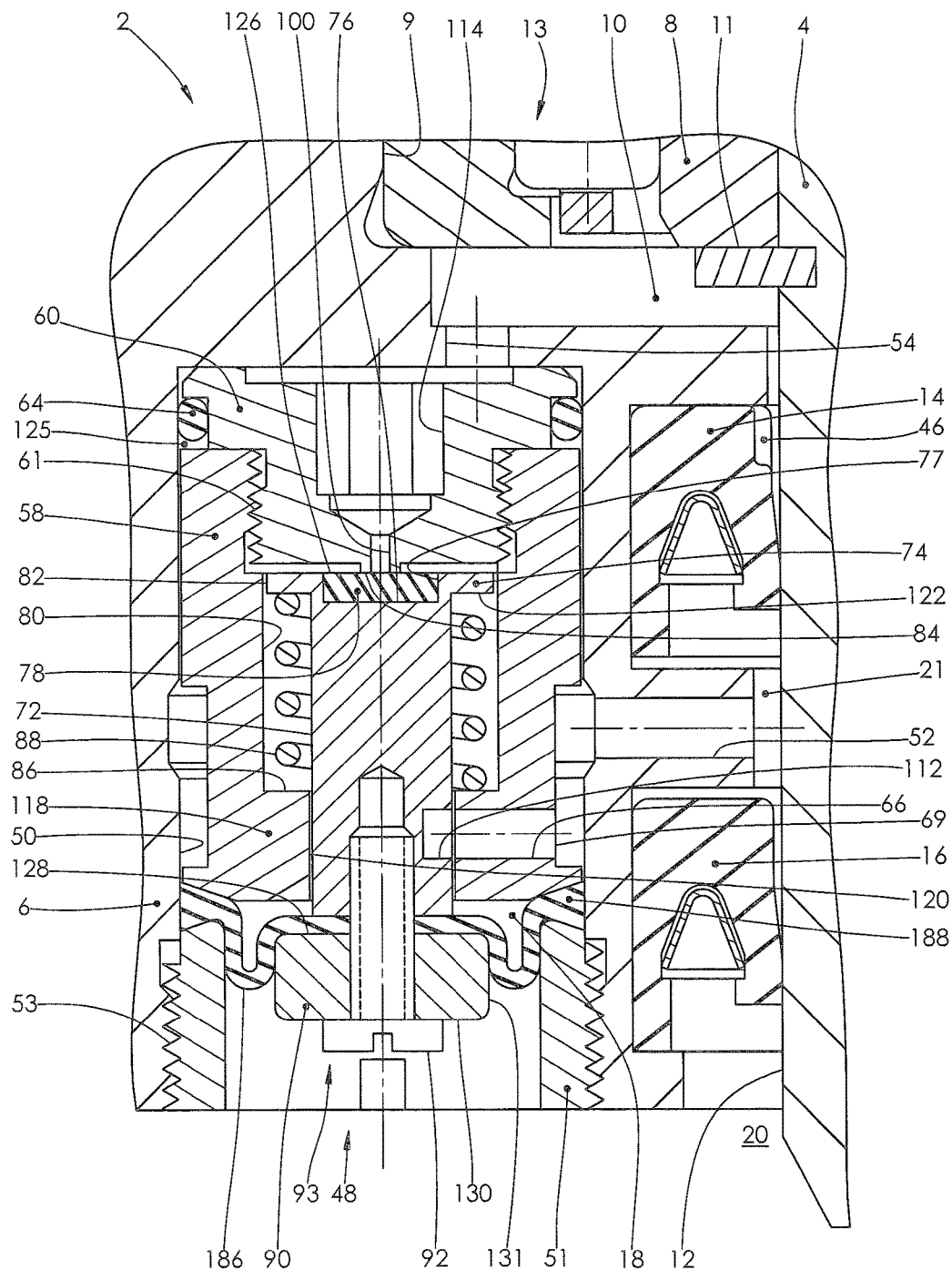
FIG. 3A is a fragmentary cross-sectional view of a second preferred embodiment of a sealing arrangement at a first angular location showing inboard and outboard seals and a valve assembly.
Figure 3B:
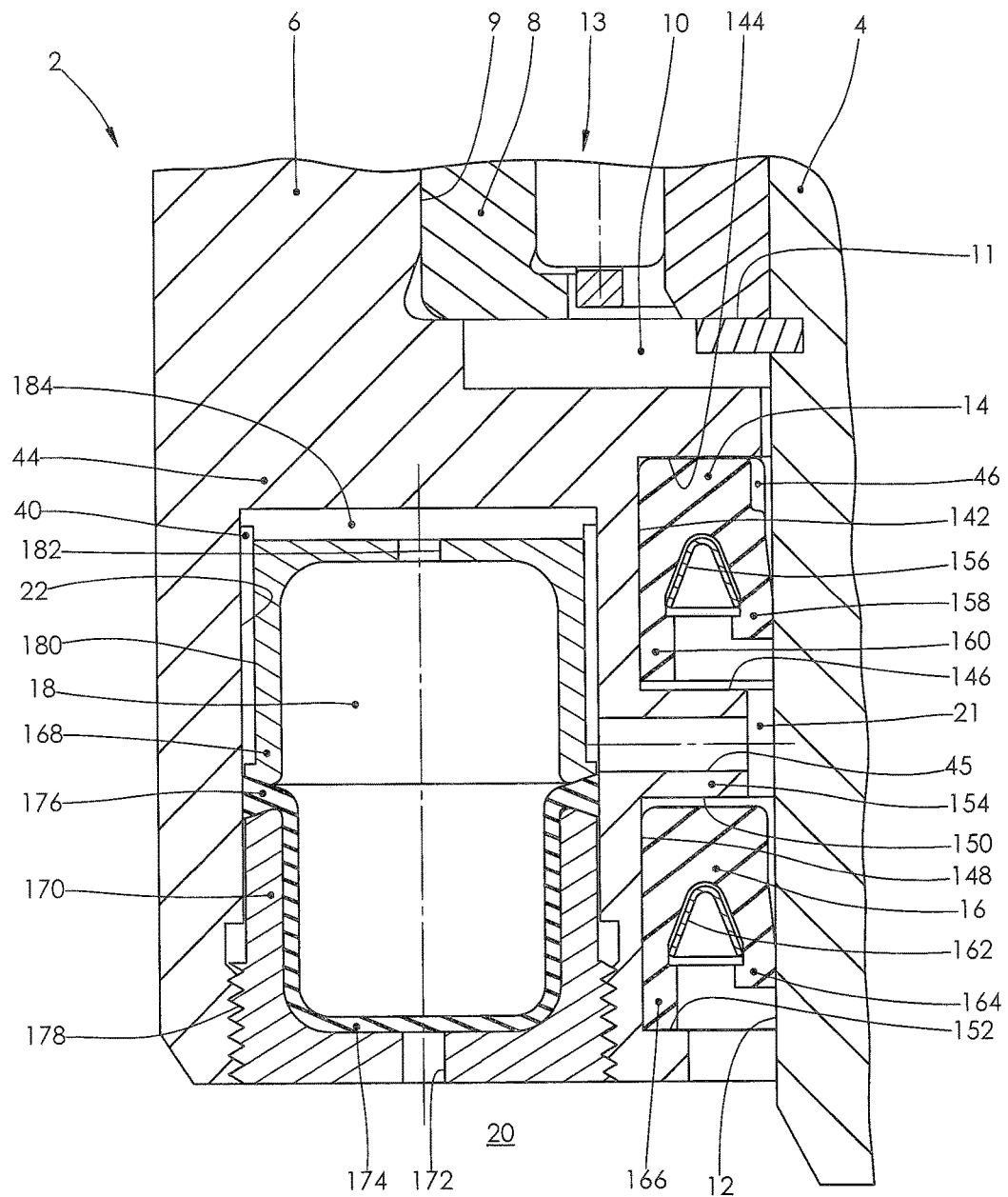
FIG. 3B is a fragmentary cross-sectional view of the sealing arrangement of FIG. 3A at a second angular location showing the inboard and outboard seals and a pressure compensation assembly.

FIGS. 3A and 3B

FIGS. 3A and 3B are fragmentary cross-sectional views representing two different angular locations of a preferred embodiment of the present invention. FIGS. 3A-3B should be studied together, to attain a more complete understanding of the invention.

Referring now to FIG. 3A, a sealing arrangement is shown generally at 2. Preferably, a shaft 4 is located at least partially within a housing 6 and is movable relative to the housing 6 in at least one circumferential or axial direction. Preferably, the shaft 4 and housing 6 are located radially and axially relative to one another by one or more bearings. A representative bearing is identified by reference number 8.

Preferably, the bearing 8 is located within a bearing chamber 13 that is located radially between a bearing mounting bore 9 of the housing 6 and a portion of the shaft 4. Preferably, the bearing 8 is exposed to and lubricated by a bearing lubricant 10 having a bearing lubricant pressure that may be equal to atmospheric pressure. If desired, the bearing 8 can be mounted within the bearing mounting bore 9 of the housing 6. If desired, the shaft 4 can incorporate a bearing shoulder 11 for locating, or being located by, the bearing 8.

Preferably, the shaft 4 has a sealing surface 12 that is generally cylindrical and faces radially outward. Preferably, at least a portion of the sealing surface 12 is encircled by at least a portion of the housing 6. Preferably, at least a portion of the housing 6 is located radially outward from and encircles at least a portion of the shaft 4.

Preferably, the sealing surface 12 is engaged by an inboard dynamic seal 14 and an outboard dynamic seal 16 that have a sliding sealed relationship with the sealing surface 12 when the shaft 4 has relative movement with respect to the housing 6.

Preferably, a barrier fluid 18 having a barrier fluid pressure is located between the inboard dynamic seal 14 and the outboard dynamic seal 16 and a process fluid 20 is located outboard of the outboard dynamic seal 16. Preferably, the inboard dynamic seal 14 is exposed to the bearing lubricant 10 and the barrier fluid 18 and separates the bearing lubricant 10 from the barrier fluid 18 and separates the bearing lubricant pressure from the barrier fluid pressure. Preferably, the outboard dynamic seal 16 is exposed to the barrier fluid 18 and the process fluid 20 and separates the barrier fluid 18 from the process fluid 20 and separates the barrier fluid pressure from the process fluid pressure. The barrier fluid 18 is preferably a lubricant and is preferably the same type and viscosity of lubricant as the bearing lubricant 10.

Preferably, a barrier fluid chamber 21 is located axially between the inboard dynamic seal 14 and the outboard dynamic seal 16 and radially between the housing 6 and the sealing surface 12 of the shaft 4. Preferably, the barrier fluid chamber 21 is located outboard of the inboard dynamic seal 14 and inboard of the outboard dynamic seal 16.

Preferably, the barrier fluid chamber 21 is defined in part by the inboard dynamic seal 14 and the outboard dynamic seal 16, and is defined in part by the housing 6 and the sealing surface 12 of the shaft 4. Preferably, some of the barrier fluid 18 is located at least partially within the barrier fluid chamber 21.

Temporarily referring now to FIG. 3B, the sealing arrangement is shown generally at 2, and the shaft 4, housing 6, bearing 8, bearing mounting bore 9, bearing lubricant 10, bearing shoulder 11, sealing surface 12, bearing chamber 13, inboard dynamic seal 14, outboard dynamic seal 16, barrier fluid 18, process fluid 20, and barrier fluid chamber 21 are identified with reference numbers. Preferably, a recess 22 of generally cylindrical shape is formed in the housing 6. Preferably, a reservoir cup 168 and a reservoir cover 170 are located within the recess 22, and the axes of the recess 22 and reservoir cup 168 are parallel to the sealing surface 12. Preferably, the reservoir cup 168 and the reservoir cover 170 are annular components.

A pressure compensation diaphragm 174 is preferably located at least partially within the recess 22 and preferably has a diaphragm bead 176 that is clamped between the reservoir cup 168 and the reservoir cover 170. The pressure compensation diaphragm 174 is preferably exposed to the barrier fluid 18 on one side and is preferably exposed to the process fluid 20 on the other side, and preferably partitions the barrier fluid 18 from the process fluid 20. Preferably, the pressure compensation diaphragm 174 is axially movable within the recess 22, and this movement allows the pressure compensation diaphragm 174 to balance the barrier fluid pressure of the barrier fluid 18 to approximately the same pressure as the process fluid pressure of the process fluid 20. The reservoir cup 168, reservoir cover 170, and pressure compensation diaphragm 174 are preferably retained within the recess 22 by cover threads 178.

The pressure compensation diaphragm 174 serves as a movable partition having a predetermined range of movement that is located between the barrier fluid 18 and the process fluid 20 and causes the barrier fluid pressure to approximate the process fluid pressure when the movable partition is operating within its predetermined range of movement. The use of a pressure compensation diaphragm 174 for balancing the pressure of the barrier fluid 18 to the pressure of the process fluid 20 is known in the prior art. Preferably, the reservoir cup 168 and the reservoir cover 170 establish the predetermined range of movement of the pressure compensation diaphragm 174.

Preferably, the diaphragm bead 176 provides sealing between the recess 22 and the reservoir cover 170, and between the reservoir cup 168 and the reservoir cover 170. If desired, however, sealing between the recess 22 and the reservoir cover 170 could be provided by a separate seal.

As a consequence of the barrier fluid pressure of the barrier fluid 18 being about the same as the process fluid pressure of the process fluid 20, the outboard dynamic seal 16 is exposed to little or no differential pressure, and the inboard dynamic seal 14 is exposed to roughly the same differential pressure that exists between the process fluid 20 and the bearing lubricant 10. Since the inboard dynamic seal 14 is exposed to relatively clean bearing lubricant 10 on one side, and is exposed to relatively clean barrier fluid 18 on the other, it is protected from the abrasives that are present in the process fluid 20, which is an ideal situation for a dynamic seal that is exposed to, and required to withstand, significant differential pressure. Since the outboard dynamic seal 16 is exposed to little differential pressure, it is in an ideal situation for a lip type dynamic seal that is exposed to, and intended to resist, the abrasive content of the process fluid 20.

Preferably, the reservoir cup 168 has an annular recessed surface 180 that is generally cylindrical and faces generally radially outward and forms an annular passageway 40 that is located radially between the annular recessed surface 180 and the recess 22. An end of the reservoir cup 168 preferably has a lubricant hole 182 and lateral slot 184 to communicate barrier fluid 18 from within the reservoir cup 168 to the annular passageway 40. If desired, the pressure compensation diaphragm 174 could be locally reinforced to prevent extrusion into the lubricant hole 182. For example, the pressure compensation diaphragm 174 could be locally reinforced with metal, although this is not illustrated.

The housing 6 preferably has a fluid hole 45 to communicate the barrier fluid 18 and the barrier fluid pressure from the annular passageway 40 to the barrier fluid chamber 21 between the inboard dynamic seal 14 and the outboard dynamic seal 16. Preferably, an end of the fluid hole 45 forms an opening in the recess 22, and an opposite end of the fluid hole 45 faces radially inward toward the sealing surface 12. Preferably, the reservoir cover 170 has a process fluid hole 172 to admit the entry of the process fluid 20 and the process fluid pressure. If desired, the pressure compensation diaphragm 174 could be locally reinforced to prevent extrusion into the process fluid hole 172 in the unlikely event that the barrier fluid pressure becomes substantially greater than the process fluid pressure. For example, the pressure compensation diaphragm 174 could be locally reinforced with metal, although this is not illustrated.

Throughout this specification, the inboard dynamic seal 14 and the outboard dynamic seal 16 preferably do not rotate relative to the housing 6, however arrangements are certainly possible where the inboard dynamic seal 14 and the outboard dynamic seal 16 could be mounted in seal grooves formed in the shaft 4, and could rotate relative to a sealing surface formed by the housing 6.

The inboard dynamic seal 14 is preferably selected from the group of rotary seals that have hydrodynamic features (i.e., waves) that in at least some pressure conditions force (i.e., pump) a film of the bearing lubricant 10 into the dynamic sealing interface between the inboard dynamic seal 14 and the sealing surface 12 of the shaft 4 when relative rotation exists between the shaft 4 and the inboard dynamic seal 14. In addition to lubricating the dynamic sealing interface, the waves preferably produce a hydrodynamic pumping-related movement of bearing lubricant 10 into the barrier fluid 18 and into the barrier fluid chamber 21, even though the barrier fluid pressure is typically greater than the bearing lubricant pressure.

In FIGS. 3A and 3B, the inboard dynamic seal 14 is illustrated as a KLS-brand lip seal that is marketed by Kalsi Engineering, Inc. ("KLS" is a registered trademark of Kalsi Engineering, Inc.) A hydrodynamic wave of this type of seal is identified by the reference number 46. With this specific type of hydrodynamic seal, a trailing edge portion of the hydrodynamic wave 46 is urged into contact with sealing surface 12 by differential pressure acting across the inboard dynamic seal 14. Other types of hydrodynamic seals, which are also appropriate for use in the sealing arrangement 2, have hydrodynamic waves that always remain engaged with the sealing surface 12, even when little or no differential pressure acts across the seal.

Because the hydrodynamic pumping action is pumping bearing lubricant 10 into the barrier fluid 18, the pumping action moves the pressure compensation diaphragm 174 axially until the pressure compensation diaphragm 174 contacts and is halted by the reservoir cover 170. The pumping action eventually tends to raise the barrier fluid pressure of the barrier fluid 18 slightly above the process fluid pressure of the process fluid 20, creating a differential pressure situation across the outboard dynamic seal 16. If the outboard dynamic seal 16 is a lip-type seal, as illustrated, the outboard dynamic seal 16 will vent at some level of differential pressure, allowing some of the barrier fluid 18 to escape into the process fluid 20. The result would be a gradual, but nevertheless undesirable, loss of bearing lubricant 10 over time. The sealing arrangement 2 is configured to minimize or eliminate such loss of bearing lubricant 10 past the outboard dynamic seal 16.

Referring again to FIG. 3A, a valve is identified generally at 48. The purpose of the valve 48 is to allow the hydrodynamic pumping-related increase in the barrier fluid pressure of the barrier fluid 18 to force barrier fluid 18 into the bearing lubricant 10, to compensate for the bearing lubricant 10 being pumped into the barrier fluid 18 by the inboard dynamic seal 14, and to reduce or prevent the loss of barrier fluid 18 past the outboard dynamic seal 16 and into the process fluid 20, so that the loss of bearing lubricant 10 is reduced or eliminated.

The valve 48 is preferably located within a valve recess 50 of the housing 6, as shown, and is preferably retained within the valve recess 50 by a valve retaining ring 51, which may be threadedly retained to the housing 6 by retaining ring threads 53, as shown. The valve recess 50 is preferably an internal generally cylindrical recess in the housing 6, as illustrated.

An inlet passageway 52 is preferably provided to communicate barrier fluid 18 and the pressure of the barrier fluid from the barrier fluid chamber 21 between the inboard dynamic seal 14 and outboard dynamic seal 16 to the valve recess 50 and the valve 48. Preferably, the inlet passageway 52 is formed in the housing 6. Preferably, an outlet passageway 54 is provided in the housing 6 to communicate from the valve recess 50 and the valve 48 and to the bearing chamber 13 that contains the bearing 8.

The valve 48 preferably incorporates a first body component 58 and a second body component 60, and the second body component 60 is preferably threadedly retained to the first body component 58, such as with body threads 61. Preferably, the first body component 58 and the second body component 60 are annular components.

Preferably, a valve stem 72 is located at least partially within the first body component 58 and forms a spring shoulder 74 and also forms a seat pocket that includes a seat pocket floor 76 and a seat pocket wall 77. Preferably, a movable seat 78 is located at least partially within the seat pocket. Preferably, either the first body component 58 or the second body component 60 forms a guide bore 80 that faces in a generally radially inward direction toward the spring shoulder 74, and preferably the spring shoulder 74 forms a stem guiding surface 82 that faces in a generally radially outward direction toward the guide bore 80, and by virtue of its clearance fit with the guide bore 80 locates an end of the valve stem 72 radially.

Preferably the second body component 60 mounts or includes a stationary seat 84 that is engaged by the movable seat 78 when the valve 48 is closed. Preferably the first body component 58 incorporates an internal body shoulder 86 that faces in a generally axial direction. Preferably, a compression spring 88 is mounted between, contacts, and is compressed between the internal body shoulder 86 and the spring shoulder 74, urging the valve stem 72 axially toward the second body component 60 and thus causing the movable seat 78 to contact and initiate sealing with the stationary seat 84.

Preferably, a valve control piston 90 is secured to the valve stem 72 by any suitable means, such as the threaded fastener 92 that is illustrated. The valve control piston 90 and movable seat 78 are parts of a movable assembly shown generally at 93 that is axially movable relative to the stationary seat 84, the housing 6, and an outlet port 100. The movable assembly 93 may include the valve stem 72, the valve control piston 90, the movable seat 78, the threaded fastener 92 and a piston diaphragm 186. The piston diaphragm 186 is preferably a rolling diaphragm, as illustrated. The piston diaphragm 186 is preferably made from elastomer or fabric-reinforced elastomer, but could, if desired, be a metal diaphragm, or an elastomer or fabric-reinforced elastomer diaphragm that is locally reinforced with another material to resist extrusion into the process fluid hole 172 (FIG. 3B) and the lubricant hole 182 (FIG. 3B).

Preferably, a piston diaphragm bead 188 is clamped between the valve retaining ring 51 and the first body component 58, providing a sealed relationship between the valve retaining ring 51 and the first body component 58 and providing a sealed relationship between the first body component 58 and the housing 6, and serving as a first body seal between the first body component 58 and the valve recess 50 of the housing 6. Alternatively, this first body seal function could be fulfilled by a separate seal, such as an O-ring.

A second body seal 64 preferably establishes sealing between the second body component 60 of the valve 48 and the valve recess 50. Preferably the piston diaphragm bead 188 partitions the barrier fluid 18 from the process fluid 20, and the second body seal 64 partitions the barrier fluid 18 from the bearing lubricant 10.

The barrier fluid 18 is communicated from the sealed region between the inboard dynamic seal 14 and the outboard dynamic seal 16 to the sealed region between the piston diaphragm bead 188 and second body seal 64 by the inlet passageway 52. The first body component 58 preferably has an inlet port 66 that is oriented in a generally radial direction. Preferably, the inlet port 66 is in fluid communication with the inlet passageway 52 and the barrier fluid chamber 21. This fluid communication preferably allows the barrier fluid 18 and the barrier fluid pressure to communicate from the barrier fluid chamber 21 to the inlet port 66. If desired, the inlet port 66 can be formed at a wrench flat 69 formed in the first body component 58. The previously described axial compression of the compression spring 88 produces an axial force that acts on the movable assembly 93 in an axial direction toward the stationary seat 84.

Preferably, the piston diaphragm 186 provides sealing between the first body component 58 and the movable assembly 93. The piston diaphragm 186 partitions the barrier fluid 18 from the process fluid 20, so that the process fluid pressure of the process fluid 20 acts on the movable assembly 93 in a direction toward the stationary seat 84, and so that the barrier fluid pressure of the barrier fluid 18 acts on the movable assembly 93 in a direction away from the stationary seat 84. If the barrier fluid pressure of the barrier fluid 18 increases over the process fluid pressure of the process fluid 20 to the extent necessary to overcome the axial force of the compression spring 88 and move the movable seat 78 slightly away from the stationary seat 84, a small amount of barrier fluid 18 flows between the seats and into the bearing lubricant 10. This is known as cracking the seat. This flow is driven by the difference in pressure between the barrier fluid pressure of the barrier fluid 18 and the bearing lubricant pressure of the bearing lubricant 10. With a slight amount of such flow, the barrier fluid pressure of the barrier fluid 18 drops, allowing the compression spring 88 to reseat the movable seat 78 against the stationary seat 84, which halts the flow of the barrier fluid 18 into the bearing lubricant 10. Preferably, the seats crack open before the barrier fluid pressure causes the barrier fluid 18 to vent past the outboard dynamic seal 16 and into the process fluid 20.

To be clear, the piston diaphragm 186 contacts and produces a sealed relationship between the first body component 58 and the movable assembly 93, and more specifically produces a sealed relationship between the first body component 58 and the valve control piston 90 and valve stem 72 of the movable assembly 93. This sealed relationship creates a first pressure area acted on by the process fluid pressure and creates a second pressure area acted on by the barrier fluid pressure. The process fluid pressure acting on the first pressure area produces a first axial force acting on the movable assembly 93 in a generally axial direction toward the stationary seat 84. The barrier fluid pressure acting on the second pressure area produces a second axial force acting on the movable assembly 93 in a generally axial direction away from the stationary seat 84. It should be understood that the second pressure area does not include the small sealed area established by sealing contact between the movable seat 78 and the stationary seat 84, this small sealed area being subtractive from the second pressure area.

Preferably, the stationary seat 84 encircles and is located radially outward from an axially-facing end of the outlet port 100. The outlet port 100 accommodates the flow of the barrier fluid 18 into the bearing lubricant 10 when the seats crack open. As a result of the valve 48 functioning as described, the net loss of the bearing lubricant due to the hydrodynamic pumping action of the inboard dynamic seal 14 is essentially zero, allowing the sealing arrangement 2 to operate for long periods of time without the need to replenish the bearing lubricant 10.

The outlet port 100 is exposed to the bearing lubricant 10 and the bearing lubricant pressure, and preferably has first and second open ends that face in generally opposite axial directions. The outlet port 100 is preferably in fluid communication with the bearing chamber 13, as shown. Preferably, the movable assembly 93 is axially movable relative to the housing 6, the stationary seat 84, and the outlet port 100.

If desired, the second body component 60 can incorporate a hex pocket 114 that effectively forms a part of the outlet port 100. If desired, the hex pocket 114 is engaged by a hex wrench when assembling the second body component 60 to the first body component 58.

Preferably, the internal body shoulder 86 faces in a generally axial direction toward the spring shoulder 74 and the second body component 60. Preferably, the internal body shoulder 86 faces generally away from the valve control piston 90. Preferably, the internal body shoulder 86 is located radially outward from, and encircles, a portion of the valve stem 72. Preferably, the internal body shoulder 86 faces in a generally axial direction toward and contacts the compression spring 88.

Preferably, the internal body shoulder 86 is a generally axially-facing surface of a spring shelf 118. If desired, the spring shelf 118 may be integral to the first body component 58, as shown. Preferably, the spring shelf 118 is located radially outward from, and encircles a portion of, the valve stem 72, as shown. Preferably, the spring shelf 118 has a shelf bore 120 that faces in a generally radially inward direction, toward the valve stem 72, and provides radial guidance to the valve stem 72. Preferably, the inlet port 66 is a generally radially oriented hole that penetrates through the spring shelf 118 and forms a generally radially inwardly-facing opening in the shelf bore 120 that faces toward the valve stem 72. If desired, the valve stem 72 may incorporate a generally radially oriented engagement hole 112 that is temporarily engaged by a pin when tightening the threaded fastener 92.

The spring shoulder 74 preferably has a shoulder surface 122 that faces in a generally axial direction toward the internal body shoulder 86 and the valve control piston 90. The shoulder surface 122 preferably faces toward and contacts the compression spring 88, and the compression spring 88 is axially compressed by and between the shoulder surface 122 and the internal body shoulder 86. The axial distance between the shoulder surface 122 and the internal body shoulder 86 is preferably less than the uncompressed length of the compression spring 88. The shoulder surface 122 preferably faces in a generally axial direction toward the spring shelf 118. The spring shoulder 74 may be located axially between a portion of the second body component 60 and the compression spring 88, as shown. The spring shoulder 74 may be located axially between a portion of the second body component 60 and the internal body shoulder 86, as shown. The spring shoulder 74 may be located axially between a portion of the second body component 60 and the spring shelf 118, as shown. The spring shoulder 74 may be located axially between a portion of the second body component 60 and the valve control piston 90, as shown.

Preferably, the compression spring 88 is a coil spring, as shown. The compression spring 88 is preferably located radially outward from and encircles a portion of the valve stem 72, as shown. The compression spring 88 is preferably located axially between the spring shoulder 74 and the internal body shoulder 86. The compression spring may be located radially between a portion of the first body component 58 and a portion of the valve stem 72, as shown. The compression spring 88 may be located axially between a portion of the second body component 60 and a portion of the first body component 58, as shown. The compression spring 88 may be located axially between a portion of the second body component 60 and a portion of the valve control piston 90, as shown. The compression spring 88 may be located axially between the spring shoulder 74 and the spring shelf 118, as shown. The compression spring 88 may be located axially between the spring shoulder 74 and the valve control piston 90, as shown.

The second body seal 64 is preferably mounted in a second body seal groove 125 that is formed in the second body component 60 and faces generally radially outward toward the valve recess 50, as shown. The second body seal 64 is preferably made out of resilient polymeric sealing material, such as an elastomer, and may, if desired, be an O-ring, as shown.

The seat pocket floor 76 preferably faces in a generally axial direction toward the movable seat 78 and the stationary seat 84, and generally away from the valve control piston 90. The seat pocket wall 77 preferably faces in a generally radially inward direction toward the movable seat 78 and generally away from the spring shoulder 74. The seat pocket wall 77 preferably adjoins the seat pocket floor 76. The movable seat 78 is preferably located axially between the seat pocket floor 76 and the stationary seat 84. Preferably, the movable seat 78 is made from a polymer such as plastic or elastomer.

Preferably, the movable seat 78 has a seating surface 126 that faces in a generally axial direction toward and adjoining the stationary seat 84 and is generally planar in shape. Preferably, the seating surface 126 faces in a generally axial direction toward the outlet port 100. The seating surface 126 preferably faces in a generally axial direction away from the seat pocket floor 76, and away from the valve control piston 90. The valve 48 is of the "normally closed" variety of valves, and the seating surface 126 normally contacts the stationary seat 84, producing a sealed relationship with the stationary seat 84. The stationary seat 84 is preferably an end surface of an axially projecting annular portion of the second body component 60, as shown.

The movable seat 78, the valve control piston 90, and the valve stem 72 are preferably axially movable together, relative to the housing 6, the stationary seat 84, and the outlet port 100.

The axial force produced by the axial compression of the compression spring 88 helps to load the seating surface 126 against the stationary seat 84, keeping the valve 48 in a normally closed condition, except when the barrier fluid pressure becomes greater than the process fluid pressure and causes the valve 48 to open.

When the barrier fluid pressure of the barrier fluid 18 is greater than the process fluid pressure of the process fluid 20, the resulting differential pressure acting on the movable assembly 93 creates an axial force on the movable assembly 93 acting away from the stationary seat 84, which opposes the axial force produced by the compression spring 88. When this differential pressure is great enough, the seating surface 126 no longer has a sealed relationship with the stationary seat 84, and the barrier fluid pressure of the barrier fluid 18 causes a small amount of the barrier fluid 18 to escape by flowing into the bearing lubricant 10. This small amount of flow of the barrier fluid 18 reduces the barrier fluid pressure. As the barrier fluid pressure approaches the process fluid pressure, the compression spring 88 causes the seating surface 126 to reestablish sealing contact with the stationary seat 84.

Preferably, the valve control piston 90 is an annular component that has a first piston end 130 that faces toward and is exposed to the process fluid 20 and the process fluid pressure and faces generally axially away from the barrier fluid 18, the spring shelf 118, the compression spring 88, the spring shoulder 74, the stationary seat 84, the outlet port 100, and the second body component 60. The valve control piston 90 also preferably has a second piston end 128 that faces in a generally axial direction toward the barrier fluid 18, the spring shelf 118, the compression spring 88, the spring shoulder 74, the stationary seat 84, the outlet port 100, and the second body component 60. Preferably, the piston diaphragm 186 is clamped axially between the valve stem 72 and the valve control piston 90 by the threaded fastener 92.

Preferably, the inlet port 66 is in fluid communication with at least a portion of the valve stem 72 and with at least a portion of the seating surface 126. Preferably, the valve control piston 90 has a piston outer surface 131 that is generally cylindrical and faces generally radially outward. Preferably, the piston outer surface 131 supports the piston diaphragm 186 when the barrier fluid pressure is greater than the process fluid pressure.

Referring again to FIG. 3B, the inboard dynamic seal 14 is preferably mounted in and located by a pressure seal groove formed in the housing 6 that includes a pressure seal groove bore 142, a pressure seal support wall 144, and a pressure seal capture wall 146. Preferably, the pressure seal support wall 144 faces generally toward the inboard dynamic seal 14, and supports the inboard dynamic seal 14 against the differential pressure that occurs when the barrier fluid pressure of the barrier fluid 18 is greater than the bearing lubricant pressure of the bearing lubricant 10. Preferably, the pressure seal support wall 144 and the pressure seal capture wall 146 face in generally axial directions, toward one another. The pressure seal support wall 144 and the pressure seal capture wall 146 preferably adjoin the pressure seal groove bore 142.

The outboard dynamic seal 16 is preferably mounted in and located by a barrier seal groove formed in the housing 6 that includes a barrier seal groove bore 148, a barrier seal support wall 150, and a barrier seal capture wall 152. Preferably, the barrier seal support wall 150 faces generally toward the outboard dynamic seal 16 and supports the outboard dynamic seal 16 against the differential pressure that would occur in the unlikely event that the process fluid pressure of the process fluid 20 becomes greater than the barrier fluid pressure of the barrier fluid 18. The barrier seal support wall 150 and the barrier seal capture wall 152 preferably face in generally axial directions, toward one another. Preferably, the barrier seal capture wall 152 contacts and supports the outboard dynamic seal 16 when the barrier fluid pressure of the barrier fluid 18 is greater than the process fluid pressure of the process fluid 20. The barrier seal support wall 150 and the barrier seal capture wall 152 preferably adjoin the barrier seal groove bore 148.

Since the pressure seal groove and the barrier seal groove are preferably formed in the housing 6, it can be said that preferably, the inboard dynamic seal 14 and the outboard dynamic seal 16 are located by the housing 6 and are in sealed contact with both the housing 6 and the shaft 4.

Preferably, the pressure seal capture wall 146 and the barrier seal support wall 150 are surfaces of wall structure 154 that is part of the housing 6 and is located axially between the inboard dynamic seal 14 and the outboard dynamic seal 16. Preferably, the fluid hole 45 passes in a generally radial direction through the wall structure 154 and forms an opening in the recess 22. Preferably, the wall structure 154 is located radially outward of, and encircles, and has radial clearance with respect to, the sealing surface 12. Preferably, this radial clearance forms at least part of the barrier fluid chamber 21.

Preferably the pressure seal groove bore 142 and the barrier seal groove bore 148 are generally cylindrical in shape, and face radially inward toward and encircle the sealing surface 12. Preferably, the inboard dynamic seal 14 is located radially between and contacts the pressure seal groove bore 142 and the sealing surface 12. Preferably the outboard dynamic seal 16 is located radially between and contacts the barrier seal groove bore 148 and the sealing surface 12. Preferably, the inboard dynamic seal 14 is located axially between and in intermediate location to the bearing 8 and the outboard dynamic seal 16.

If desired, the inboard dynamic seal 14 may include a pressure seal spring 156 that loads an inner pressure seal lip 158 against the sealing surface 12 and loads an outer pressure seal lip 160 against the pressure seal groove bore 142. If desired, the pressure seal spring 156 may be a conventional V-spring, as shown, or any other suitable spring. If desired, the outboard dynamic seal 16 may include a barrier seal spring 162 that loads an inner barrier seal lip 164 against the sealing surface 12 and loads an outer barrier seal lip 166 against the barrier seal groove bore 148. Preferably, the inboard dynamic seal 14 and the outboard dynamic seal 16 are made at least in part from polymer. If desired, the polymeric construction of the inboard dynamic seal 14 and the outboard dynamic seal 16 can be a composite construction that includes both plastic and elastomer.

NOMENCLATURE LIST

Sealing arrangement 2
Shaft 4
housing 6
bearing 8
bearing mounting bore 9
bearing lubricant 10
bearing shoulder 11
sealing surface 12
bearing chamber 13
inboard dynamic seal 14
outboard dynamic seal 16
barrier fluid 18
process fluid 20
barrier fluid chamber 21
recess 22
reservoir tube 24
reservoir cup 25
tube seal 26
reservoir cover 27
pressure compensation piston 28
piston seal 30
piston seal groove 32
tube retaining ring 34
transverse pin 36
recessed annular surface 38
annular passageway 40
tube bore 42
notches 44
fluid hole 45
hydrodynamic wave 46
valve 48
valve recess 50
valve retaining ring 51
inlet passageway 52
retaining ring threads 53
outlet passageway 54
stepped bore 56
first body component 58
second body component 60
body threads 61
first body seal 62
second body seal 64
inlet port 66
longitudinal slot 68
wrench flat 69
recess 70
valve stem 72
spring shoulder 74
seat pocket floor 76
seat pocket wall 77
movable seat 78
guide bore 80
stem guiding surface 82
stationary seat 84
internal body shoulder 86
compression spring 88
valve control piston 90
piston retaining ring 91
threaded fastener 92
movable assembly 93
stem seal 94
control piston seal 96
piston seal groove 98
outlet port 100
static seal 102
seat component 104
flange surface 106
seat threads 108
spanner pockets 110
engagement hole 112
hex pocket 114
purchase flange 116
spring shelf 118
shelf bore 120
shoulder surface 122
first body seal groove 124
second body seal groove 125
seating surface 126
second piston end 128
first piston end 130
piston outer surface 131
piston recess 132
stem opening 133
stem seal groove 134
process fluid end 136
barrier fluid end 138
piston guide surface 140
pressure seal groove bore 142
pressure seal support wall 144
pressure seal capture wall 146
barrier seal groove bore 148
barrier seal support wall 150
barrier seal capture wall 152
wall structure 154
pressure seal spring 156
inner pressure seal lip 158
outer pressure seal lip 160
barrier seal spring 162
inner barrier seal lip 164
outer barrier seal lip 166
reservoir cup 168
reservoir cover 170 process fluid hole 172
pressure compensation diaphragm 174
diaphragm bead 176
cover threads 178
annular recessed surface 180
lubricant hole 182
lateral slot 184
piston diaphragm 186

CONCLUSION

In view of the foregoing it is evident that the embodiments of the present invention are adapted to attain some or all of the aspects and features hereinabove set forth, together with other aspects and features which are inherent in the apparatus disclosed herein.

Even though several specific geometries are disclosed in detail herein, many other geometrical variations employing the basic principles and teachings of this invention are possible. The foregoing disclosure and description of the invention are illustrative and explanatory thereof, and various changes in the size, shape and materials, as well as in the details of the illustrated construction, may be made without departing from the spirit of the invention. The present embodiments are, therefore, to be considered as merely illustrative and not restrictive, the scope of the invention being indicated by the claims rather than the foregoing description, and all changes which come within the meaning and range of equivalence of the claims are therefore intended to be embraced therein.

I claim:

1. A sealing arrangement, comprising:
a shaft (4) and a housing (6), at least a portion of said housing radially outward from and encircling at least a portion of said shaft, said shaft being movable relative to said housing;
a bearing chamber (13) located radially between at least a portion of said housing and at least a portion of said shaft;
a bearing (8) located at least partially within said bearing chamber and providing radial guidance between said housing and said shaft;
an inboard dynamic seal (14) and an outboard dynamic seal (16) contacting and establishing sealing with said housing and said shaft;
a barrier fluid chamber (21) located axially between said inboard dynamic seal and said outboard dynamic seal, and located radially between said shaft and said housing;
a bearing lubricant (10) at least partially within said bearing chamber and having a bearing lubricant pressure;
a barrier fluid (18) at least partially within said barrier fluid chamber and having a barrier fluid pressure;
a process fluid (20) located outboard of said outboard dynamic seal and having a process fluid pressure,
wherein said inboard dynamic seal is exposed to said bearing lubricant and said barrier fluid, separates said bearing lubricant from said barrier fluid, and separates said bearing lubricant pressure from said barrier fluid pressure, and
said outboard dynamic seal is exposed to said barrier fluid and said process fluid, and separates said barrier fluid from said process fluid;
an outlet port (100) in fluid communication with said bearing chamber and exposed to said bearing lubricant and said bearing lubricant pressure, said outlet port having first and second ends;
a stationary seat (84) of annular form located radially outward from one of said first and second ends of said outlet port and being stationary relative to said housing;
a movable assembly (93) comprising a valve control piston (90) and a movable seat (78), said movable assembly axially movable relative to said housing and relative to said stationary seat and relative to said outlet port;
said valve control piston having a first piston end (130) facing in a generally axial direction away from said stationary seat and having a second piston end (128) facing in a generally axial direction toward said stationary seat;
said movable seat having a seating surface (126) facing in a generally axial direction toward and adjoining said stationary seat and facing in a generally axial direction toward said outlet port;
said barrier fluid in fluid communication with said barrier fluid chamber and with said seating surface of said movable seat;
a compression spring (88) compressed axially and producing a generally axially oriented force acting on said movable assembly in a generally axial direction toward said stationary seat;
said process fluid pressure producing a first axial hydraulic force acting on said movable assembly in a generally axial direction toward said stationary seat and said barrier fluid pressure producing a second axial hydraulic force acting on said movable assembly in a generally axial direction away from said stationary seat; and
said inboard dynamic seal being a hydrodynamic seal having a hydrodynamic pumping action in response to relative rotation between said shaft and said inboard dynamic seal, said hydrodynamic pumping action forcing a film of said bearing lubricant between said inboard dynamic seal and said shaft and into said barrier fluid.

2. The sealing arrangement of claim 1, wherein said hydrodynamic pumping action causes said barrier fluid pressure to become greater than said process fluid pressure, and said barrier fluid pressure acting on said movable assembly (93) causing at least part of said seating surface (126) of said movable seat (78) to temporarily move in a generally axial direction away from said stationary seat (84), allowing barrier fluid (18) to temporarily pass between said seating surface and said stationary seat and into said outlet port (100).

3. The sealing arrangement of claim 1, wherein at least a portion of a first body component (58) is located radially outward of and encircles at least a portion of said movable assembly (93) and has a sealed relationship with said valve control piston (90).

4. The sealing arrangement of claim 3, wherein a control piston seal (96) contacts and is radially compressed between said first body component (58) and said valve control piston (90), producing said sealed relationship between said first body component and said valve control piston.

5. The sealing arrangement of claim 3, wherein a piston diaphragm (186) provides said sealed relationship between said first body component (58) and said valve control piston (90).

6. The sealing arrangement of claim 3, wherein said sealed relationship between said first body component (58) and said valve control piston (90) creates a first pressure area acted on by said process fluid pressure producing said first axial hydraulic force and creates a second pressure area acted on by said barrier fluid pressure producing said second axial hydraulic force.

7. The sealing arrangement of claim 1, wherein a movable partition having a predetermined range of movement is located between said barrier fluid (18) and said process fluid (20), said movable partition causing said barrier fluid pressure to approximate said process fluid pressure when operating within said predetermined range of movement.

8. The sealing arrangement of claim 7, wherein said movable partition is selected from a group consisting of a pressure compensation piston (28) and a pressure compensation diaphragm (174).

9. The sealing arrangement of claim 1, wherein said movable assembly (93) includes a valve stem (72), and said compression spring (88) is guided laterally by said valve stem.

10. The sealing arrangement of claim 3, wherein a second body component (60) of annular form is threadedly retained to said first body component (58) and defines said stationary seat (84).

11. The sealing arrangement of claim 10, wherein at least one of said first and second body components defines a guide bore (80) facing radially-inward, toward and encircling at least a portion of said movable assembly (93) and providing lateral guidance to a portion of said movable assembly.

12. The sealing arrangement of claim 3, wherein said first body component (58) provides lateral guidance to a portion of said movable assembly (93).

13. The sealing arrangement of claim 10, wherein said first body component (58) has an inlet port (66) communicating said barrier fluid (18) to a portion of said movable assembly (93).

14. The sealing arrangement of claim 13, wherein said inlet port (66) is generally radially oriented, and said movable assembly (93) includes a valve stem (72) having an engagement hole (112) that is generally radially oriented and alignable with said inlet port (66).

15. The sealing arrangement of claim 10, wherein said housing (6) defines a valve recess (50) and said first and second body components are located at least partially within said valve recess.

16. The sealing arrangement of claim 15, wherein a first body seal (62) contacts and provides sealing between said first body component (58) and said housing (6).

17. The sealing arrangement of claim 15, wherein a second body seal (64) contacts, is compressed between and provides sealing between, said second body component (60) and said housing (6).

18. A sealing arrangement, comprising:
a shaft (4) and a housing (6), at least a portion of said housing radially outward from and encircling at least a portion of said shaft, said shaft being rotatable relative to said housing;
a bearing chamber (13) located radially between at least a portion of said housing and at least a portion of said shaft;
a bearing (8) located at least partially within said bearing chamber and locating said shaft radially relative to said housing;
an inboard dynamic seal (14) and an outboard dynamic seal (16) contacting and sealing between said housing and said shaft;
a barrier fluid chamber (21) located axially between said inboard dynamic seal and outboard dynamic seal and located radially between said shaft and said housing;
a bearing lubricant (10) located at least partially within said bearing chamber and having a bearing lubricant pressure;
a barrier fluid (18) located at least partially within said barrier fluid chamber and having a barrier fluid pressure;
a process fluid (20) located outboard of said outboard dynamic seal and having a process fluid pressure,
wherein said inboard dynamic seal is exposed to said bearing lubricant and said barrier fluid and separates said bearing lubricant pressure from said barrier fluid pressure, and
said outboard dynamic seal is exposed to said barrier fluid and said process fluid and separates said barrier fluid from said process fluid;
an outlet port (100) in fluid communication with said bearing chamber and exposed to said bearing lubricant and said bearing lubricant pressure;
a stationary seat (84) of annular form being stationary relative to said housing and located radially outward from said outlet port;
a movable assembly (93) comprising a valve control piston (90) and a movable seat (78), said movable assembly axially movable relative to said stationary seat and relative to said outlet port;
said valve control piston having a first piston end (130) facing in a generally axial direction away from said stationary seat and having a second piston end (128) facing in a generally axial direction toward said stationary seat;
said movable seat having a seating surface (126) facing in a generally axial direction toward and adjoining said stationary seat and facing in a generally axial direction toward said outlet port;
said barrier fluid in fluid communication with said barrier fluid chamber and with a portion of said movable assembly;
a compression spring (88) compressed axially and producing a generally axially oriented force acting on said movable assembly in a direction toward said stationary seat;
said process fluid pressure producing a first axial hydraulic force acting on said movable assembly in a generally axial direction toward said stationary seat and said barrier fluid pressure producing a second axial hydraulic force acting on said movable assembly in a generally axial direction away from said stationary seat;
said inboard dynamic seal being a hydrodynamic seal having a hydrodynamic pumping action in response to relative rotation between said shaft and said inboard dynamic seal, said hydrodynamic pumping action pushing bearing lubricant between said inboard dynamic seal and said shaft and into said barrier fluid; and
a movable partition exposed to said barrier fluid and said process fluid and having a predetermined range of movement, said movable partition causing said barrier fluid pressure to approximate said process fluid pressure when operating within said predetermined range of movement, said movable partition being selected from the group consisting of a pressure compensation piston (28) and a pressure compensation diaphragm (174).

19. The sealing arrangement of claim 18, wherein said pumping action causes said barrier fluid pressure to become greater than said process fluid pressure, and said barrier fluid pressure acting on said movable assembly (93) causes at least part of said seating surface (126) of said movable seat

(78) to temporarily move in a generally axial direction away from said stationary seat (84), allowing a portion of said barrier fluid (18) to pass between said seating surface and said stationary seat and into said outlet port (100).

20. The sealing arrangement of claim 18, wherein at least a portion of a first body component (58) is radially outward of and encircles at least a portion of said movable assembly (93) and has a sealed relationship with said valve control piston (90), said sealed relationship creating a first pressure area acted on by said process fluid pressure producing said first axial hydraulic force and creating a second pressure area acted on by said barrier fluid pressure producing said second axial hydraulic force, said sealed relationship provided by a control piston seal (96) or a piston diaphragm (186).

21. A sealing arrangement, comprising:
a shaft (4);
a housing (6) encircling at least a portion of said shaft, said shaft being movable relative to said housing;
a bearing chamber (13) between at least a portion of said housing and at least a portion of said shaft;
a bearing (8) at least partially within said bearing chamber and providing radial guidance between said housing and said shaft;
a bearing lubricant (10) at least partially within said bearing chamber and having a bearing lubricant pressure;
an inboard dynamic seal (14) and an outboard dynamic seal (16) each contacting and establishing sealing with said housing and said shaft;
a barrier fluid chamber (21) formed axially between said inboard and outboard dynamic seals, and radially between said shaft and said housing;
a barrier fluid (18) at least partially within said barrier fluid chamber and having a barrier fluid pressure;
a process fluid (20) located outboard of said outboard dynamic seal and having a process fluid pressure,
wherein said inboard dynamic seal is exposed to said bearing lubricant and said barrier fluid, separates said bearing lubricant from said barrier fluid, and separates said bearing lubricant pressure from said barrier fluid pressure, and
said outboard dynamic seal is exposed to said barrier fluid and said process fluid, and separates said barrier fluid from said process fluid;
an outlet port (100) in fluid communication with said bearing chamber and exposed to said bearing lubricant and said bearing lubricant pressure, said outlet port having a first end;
a first seat (84) of annular form located outward from said first end of said outlet port;
a movable assembly (93) comprising a second seat (78), said second seat movable relative to said first seat;
said second seat having a seating surface (126) facing toward said first seat;
said barrier fluid in fluid communication with said barrier fluid chamber and with said movable assembly;
a spring (88) producing a spring force arranged and designed to result in forcing said second seat towards said first seat;
said process fluid pressure producing a first hydraulic force acting on said movable assembly to result in forcing said second seat towards said first seat, and said barrier fluid pressure producing a second hydraulic force acting on said movable assembly to result in forcing said second seat away from said first seat; and
said inboard dynamic seal being a hydrodynamic seal having a hydrodynamic pumping action in response to relative rotation between said shaft and said inboard dynamic seal, said hydrodynamic pumping action forcing a film of said bearing lubricant between said inboard dynamic seal and said shaft and into said barrier fluid chamber.

22. The sealing arrangement of claim 21, wherein said hydrodynamic pumping action causes said barrier fluid pressure to become greater than said process fluid pressure, and said barrier fluid pressure acting on said movable assembly (93) causing at least part of said seating surface (126) of said second seat (78) to temporarily unseat from said first seat (84), allowing barrier fluid (18) to temporarily pass between said seating surface and said first seat and into said outlet port (100).

23. The sealing arrangement of claim 21, wherein a movable partition having a predetermined range of movement is located between said barrier fluid (18) and said process fluid (20), said movable partition causing said barrier fluid pressure to approximate said process fluid pressure when operating within said predetermined range of movement.

24. The sealing arrangement of claim 23, wherein said movable partition is selected from a group consisting of a pressure compensation piston (28) and a pressure compensation diaphragm (174).

\* \* \* \* \*